US 12,489,518 B2

(12) United States Patent
Kargieman et al.

(10) Patent No.: US 12,489,518 B2
(45) Date of Patent: Dec. 2, 2025

(54) SYSTEM FOR PLANETARY-SCALE ANALYTICS

(71) Applicant: Urugus S.A., Montevideo (UY)

(72) Inventors: Emiliano Kargieman, Buenos Aires (AR); Gerardo Gabriel Richarte, Caba (AR)

(73) Assignee: Urugus S.A., Montevideo (UY)

( * ) Notice: Subject to any disclaimer, the term of this patent is extended or adjusted under 35 U.S.C. 154(b) by 38 days.

(21) Appl. No.: 17/407,033

(22) Filed: Aug. 19, 2021

(65) Prior Publication Data
US 2022/0038172 A1 Feb. 3, 2022

Related U.S. Application Data

(63) Continuation of application No. 15/445,813, filed on Feb. 28, 2017, now Pat. No. 11,101,876.
(Continued)

(51) Int. Cl.
H04B 7/185 (2006.01)
G01C 11/02 (2006.01)
(Continued)

(52) U.S. Cl.
CPC ......... H04B 7/18513 (2013.01); G06V 10/25 (2022.01); G06V 10/40 (2022.01);
(Continued)

(58) Field of Classification Search
CPC .......... H04B 7/18513; G06K 9/00657; G06K 9/00637; G06K 9/3233; G06K 9/40;
(Continued)

(56) References Cited

U.S. PATENT DOCUMENTS 5,971,324 A 10/1999 Williams et al.
6,084,510 A * 7/2000 Lemelson .............. G08G 1/164
382/104
(Continued)

FOREIGN PATENT DOCUMENTS

CN 102780523 11/2012
CN 103530409 1/2014
(Continued)

OTHER PUBLICATIONS

Sherwood et al., "The Autonomous Sciencecraft Experiment" (Year: 2003).*
(Continued)

Primary Examiner — Nasim N Nirjhar
(74) Attorney, Agent, or Firm — Lee & Hayes, P.C.

(57) ABSTRACT

A smart satellite system is capable of decision making and prioritization on the fly to optimize the use of downlink bandwidth to deliver prioritized data based upon opportunity and the resources of available payloads. By providing a satellite system with substantial processing power and a level of autonomy, the satellite is able to make decisions about capturing imagery data, including image data processing, object detection, image segmentation, and re-orientation of the satellite based upon the opportunity, from the satellite's perspective, for capturing image data of areas or objects of interest. Through the use of machine learning and in-orbit image analysis, the satellite may transmit only a subset of the captured images, portions of the captured images, or the result of image analysis, thereby efficiently using the downlink communication channel.

19 Claims, 9 Drawing Sheets

Related U.S. Application Data

(60) Provisional application No. 62/301,441, filed on Feb. 29, 2016.

(51) Int. Cl.
  *G06V 10/25* (2022.01)
  *G06V 10/26* (2022.01)
  *G06V 10/40* (2022.01)
  *G06V 20/10* (2022.01)
  *G06V 20/13* (2022.01)
  *H04N 7/18* (2006.01)

(52) U.S. Cl.
  CPC ............ *G06V 20/13* (2022.01); *G06V 20/176* (2022.01); *G06V 20/188* (2022.01); *H04N 7/183* (2013.01); *G01C 11/02* (2013.01); *G06V 10/26* (2022.01)

(58) Field of Classification Search
  CPC .......... G06K 9/46; G06K 9/0063; G06K 9/34; H04N 7/183; G01C 11/02
  See application file for complete search history.

(56) References Cited

U.S. PATENT DOCUMENTS

| | | | |
|---|---|---|---|
| 6,128,555 A | 10/2000 | Hanson et al. | |
| 6,157,621 A | 12/2000 | Brown et al. | |
| 8,818,029 B1 | 8/2014 | Mecikalski et al. | |
| 9,473,898 B1 | 10/2016 | Patel et al. | |
| 2008/0063237 A1 | 3/2008 | Rubenstein | |
| 2010/0311417 A1 | 12/2010 | Korb et al. | |
| 2012/0029812 A1* | 2/2012 | Altwaijry | G06Q 10/04 701/531 |
| 2012/0155704 A1 | 6/2012 | Williams et al. | |
| 2012/0188372 A1* | 7/2012 | Ozkul | B64G 1/1021 348/E7.085 |
| 2014/0029844 A1 | 1/2014 | Padwick | |
| 2014/0040282 A1 | 2/2014 | Mann et al. | |
| 2014/0218242 A1 | 8/2014 | Platzer | |
| 2014/0222255 A1 | 8/2014 | You et al. | |
| 2014/0222472 A1* | 8/2014 | Platzer | G06Q 10/02 705/5 |
| 2014/0278082 A1 | 9/2014 | De Vries et al. | |
| 2014/0362174 A1 | 12/2014 | Fan et al. | |
| 2015/0016669 A1* | 1/2015 | Tabb | G06V 20/176 382/103 |
| 2015/0346031 A1 | 12/2015 | Sloan et al. | |
| 2015/0371115 A1 | 12/2015 | Marchisio et al. | |
| 2016/0020848 A1 | 1/2016 | Leonard | |
| 2016/0164573 A1* | 6/2016 | Birk | H02J 13/00007 375/257 |
| 2016/0171059 A1 | 6/2016 | Diamond et al. | |
| 2016/0307071 A1* | 10/2016 | Perronnin | G06F 18/214 |
| 2017/0031056 A1* | 2/2017 | Vega-Avila | G06Q 10/0635 |
| 2017/0250751 A1 | 8/2017 | Kargieman et al. | |
| 2018/0137941 A1* | 5/2018 | Chen | G06N 3/08 |
| 2018/0172823 A1 | 6/2018 | Tyc | |

FOREIGN PATENT DOCUMENTS

| | | |
|---|---|---|
| CN | 104484647 | 4/2015 |
| CN | 104849274 | 8/2015 |
| CN | 105303184 | 2/2016 |
| EP | 1698856 | 9/2006 |
| FR | 2815804 | 4/2002 |
| JP | 2001122199 A | 5/2001 |
| JP | 2003030649 A | 1/2003 |
| JP | 2008506167 A | 2/2008 |
| JP | 2013518246 A | 5/2013 |
| WO | WO03096142 | 11/2003 |
| WO | WO2011089477 | 7/2011 |

OTHER PUBLICATIONS

Rebecca (Onboard classifiers for science event detection on a remote sensing spacecraft Authors: Rebecca Castano et al in KDD '06: Proceedings of the 12th ACM SIGKDD international conference on Knowledge discovery and data mining and Published: Aug. 20, 2006, ISBN: 1595933395, DOI: 10. 1145/1150402 (Year: 2006).*
David (Onboard Machine Learning Classification of Images by a Cubesat in Earth Orbit by David R. Thompson et al. published on Jun. 2015 in AI Matters, vol. 1, Issue 4) 2015 (Year: 2015).*
CN Office Action from corresponding CN Application No. 201780013996 mailed Feb. 3, 2021, a counterpart foreign application for U.S. Appl. No. 62/301,441, 13 pages.
The Chinese Office Action mailed on May 8, 2020 for Chinese Patent Application No. 201780013996.1, a counterpart of U.S. Appl. No. 15/445,813, 14 pages.
The Chinese Office Action (English translation) mailed on May 8, 2020 for Chinese Patent Application No. 201780013996.1, a counterpart of U.S. Appl. No. 15/445,813, 15 pages.
Dehghan, et. al., "Design and Implementation of Intelligent decision making system to generate flight scenario automatically", IEEE, 2011, pp. 178-183.
European Office Action mailed Jul. 24, 2021 for European Patent Application No. 17799809.3, a counterpart foreign application of U.S. Appl. No. 15/445,813, 4 pages.
The Extended European Search Report mailed on Sep. 25, 2019 for European Patent Application No. 17799809.3, 14 pages.
The Israeli Office Action mailed on Nov. 10, 2020 for Israeli Patent Application No. 278550, a counterpart of U.S. Appl. No. 15/445,813, 2 pages.
The Section 18 Office Action mailed on Oct. 24, 2019 for Israeli Patent Application No. 261136, a counterpart of U.S. Appl. No. 15/445,813, 2 pages.
Israeli Office Action mailed Jun. 10, 2021 for Israeli Patent Application No. 278550, a foreign counterpart to U.S. Appl. No. 15/445,813, 13 pages.
The Israeli Section 18 Office Action mailed on Jul. 14, 2020 for Israeli Patent Application No. 261136, a counterpart of U.S. Appl. No. 15/445,813, 2 pages.
Japanese Office Action mailed Jan. 26, 2021 for Japanese Patent Application No. 2018-545329, 16 pages.
Lavigne et al, "Unsupervised Classification and clustering of image features for vehicle detection in large scale aerial images", Information Fusion (Fusion), 2010 13th Conference on IEEE, Jul. 26, 2010, pp. 1-8.
Office Action dtd Aug. 1, 2021 for U.S. Appl. No. 15/445,813 "System for Planetary-Scale Analytics" Kargieman, 19 pages.
Non Final Office Action dated Mar. 2, 2020 for U.S. Appl. No. 15/445,813 "System for Planetary-Scale Analytics" Kargieman, 20 pages.
Non Final Office Action dtd Jul. 29, 2019 for U.S. Appl. No. 15/445,813 "System for Planetary-Scale Analytics" Kargieman, 23 pages.
Non Final Office Action dated Sep. 21, 2020 for U.S. Appl. No. 15/445,813, "System for Planetary-Scale Analytics", Kargieman, 29 pages.
Office action for U.S. Appl. No. 15/445,813, mailed on M01/04/2019, Kargieman, "System for Planetary-Scale Analytics", 14 pages.
Office Action for U.S. Appl. No. 15/445,813, Kargieman, "System for Planetary-Scale Analytics", 19 Pages.
Office Action for U.S. Appl. No. 15/445,813, mailed on Apr. 15, 2019, Kargieman, "System for Planetary-Scale Analytics", 21 pages.
Final Office Action dated Jun. 5, 2020 for U.S. Appl. No. 15/445,813 "System for Planetary-Scale Analytics" Kargieman, 21 pages.
The PCT Search Report and Written Opinion, mailed on Nov. 13, 2017, for PCT Application No. PCT/US17/20039, 8 pages.
Verfaillie, et al., "A generic modular architecture for the control of an autonomous spacecraft", 5th International Workshop on Planning and Scheduling for Space, 2006, 9 pages.

(56) References Cited

OTHER PUBLICATIONS

Japanese Office Action mailed May 10, 2022 for Japanese Application No. 2021-074154 a divisional patent applciation to 2018-545329 a foreign counterpart to U.S. Pat. No. 11,101,876, 11 pages.
Japanese Office Action mailed May 24, 2022 for Japanese Patent Application No. 2018-545329, a foreign counterpart to U.S. Pat. No. 11,101,876, 16 pages.
O. Benderli et al., GEZGIN & GEZGIN-2: Adaptive Real-Time Image Processing Subsystems for Earth Observing Small Satellites, First NASA/ESA Conference on Adaptive Hardware and Systems (AHS'06), IEEE, Jun. 15, 2006, pp. 1 to 8.
Office action for Japanese Patent Application No. 2021-074154, mailed on Nov. 15, 2022. Kargieman, Emiliano "System for Planetary-Scale Analytics".
Canadian Office Action mailed Feb. 3, 2023 for Canadian Patent Application No. 3014446, a foreign counterpart to U.S. Pat. No. 11,101,876, 4 pages.
Israeli Notice of Allowance mailed on Mar. 10, 2024 for Israeli Patent Application No. 297135, a foreign counterpart of U.S. Appl. No. 17/407,033, 3 pages.
Chinese Office Action mailed Sep. 3, 2021 for Chinese Application No. 201780013996.1, a foreign counterpart to U.S. Pat. No. 11,101,876, 9 pages.
Japanese Office Action mailed Sep. 21, 2021 for Japanese Application No. 2018-545329, a foreign counterpart to U.S. Pat. No. 11,101,876, 15 pages.
Brazilian Office Action mailed Nov. 28, 2023 for Brazilian Application No. BR1120180172324, a foreign counterpart to U.S. Pat. No. 11,101,876, 8 pages.
Canadian Office Action mailed Dec. 6, 2023 for Canadian Application No. 3,014,446, a foreign counterpart to U.S. Pat. No. 11,101,876, 4 pages.
Office Action for Canadian Application No. 3,014,446, Dated Aug. 22, 2024, 8 pages.
Castano, et al., "Onboard classifiers for science event detection on a Remote Sensing Spacecraft", Proceedings of the Twelfht ACM SIGKDD International Conference on Knowledge Discovery and Data Mining, Aug. 20, 2009, pp. 845-851.
European Office Action mailed on May 31, 2024 for European Patent Application No. 22161426.6, a foreign counterpart of U.S. Appl. No. 15/445,813, 6 pages.

* cited by examiner

SYSTEM FOR PLANETARY-SCALE ANALYTICS

RELATED APPLICATIONS

This patent application is a continuation of, and claims priority to, co-pending U.S. patent application Ser. No. 15/445,813, filed Feb. 28, 2017, and entitled "System for Planetary-Scale Analytics," which application claims priority to U.S. Provisional Application No. 62/301,441, filed Feb. 29, 2016, and entitled "System for Planetary-Scale Analytics," which are all hereby incorporated in their entirety by reference.

BACKGROUND

One of the many functions of satellites is earth imagery. Imagery data may be collected for an area of interest on the Earth, such as for analyzing an area for agricultural, geological, cartographical, meteorological, or some other useful purpose. Useful imagery data largely depends on a relatively clear visual path to the features of interest. However, oftentimes, relevant and desired features are not viewable through satellite imagery because the features are hindered by atmospheric conditions, such as aerosols or clouds. For example, where the features of interest are on the Earth itself, clouds may obstruct the satellite's ability to capture and transmit useful imagery data.

Furthermore, typical satellite communication systems are limited in their bandwidth and vast amounts of imagery data may be an inefficient use of the available downlink bandwidth. This issue is exacerbated when the satellite imagery data includes obstructions and therefore does not include the features of interest.

Satellites in Low Earth Orbit (LEO) have visibility over a set of given geographical locations on Earth for a limited period of time per orbit, therefore efficient use of on-board payloads, including earth imagery systems, is of particular interest to maximize the usefulness of the satellite over its lifetime. Satellite payloads, including earth imagery systems, with control loops tied to earth stations impose barriers to maximizing the efficiency of their use on board LEO satellites because they require communications with, or actions performed by, earth-based components to control their operations.

SUMMARY

Considerable advantages can be realized by equipping satellites with significant processing capabilities and a level of autonomous tasking, such as based on opportunity, or based on a cost-benefit analysis, such as, for example, reducing a cost function or increasing a return on the use of one or more payloads or downlink bandwidth. Substantial on-board processing in the satellites can provide at least two technical advantages. Firstly, on-board processing can allow for maximizing or increasing bandwidth utilization, by only downloading useful information from the satellite to a receiver. Additionally, rather than download imagery, the satellite may be able to analyze the useful imagery and summarize and/or extract meaningful data from the imagery for download. Secondly, on-board processing can allow decisions to be made on-the-fly to optimize image collection opportunities and to prioritize the acquisition of valuable data.

In a non-limiting example, on-board processing of image data can maximize or increase bandwidth utilization, as illustrated in the following scenario. Consider that 60% of the world is covered with clouds, so in typical satellite imagery, 60% of the image pixels downloaded from satellites are of clouds, which obstruct the features of interest on the Earth and therefore contain no relevant information. This results in wasted imaging resources, on-board storage, transmission time, and bandwidth. If, however, the satellites themselves had the capability for executing cloud-detection algorithms, and if the satellites had the ability to segment and classify the images in-orbit and only download the parts of the images that are cloud-less, the system will have a direct gain in the information it can send to the ground.

In another non-limiting example, if a ground-based station is searching for a ship in the Gulf of Mexico, the traditional process requires that the ground-based station downloads every image of the Gulf of Mexico taken by a satellite, and then searches each downloaded image until the object of interest is located. That requires downloading a significant number of images, most of which will contain only water with no features of interest. However, if the satellites themselves can employ algorithms that detect ship candidates, such as through edge detection or object detection, then a significantly smaller number of images that contain ship-candidates may be downloaded to a ground-based station. Furthermore, the satellite may not necessarily have to capture images of the entire Gulf of Mexico, especially when the satellite is tasked to a small geo-located area around known ship candidates' coordinates. By operating in this manner, net bandwidth utilization can be reduced or minimized by reducing the amount of data, (e.g., a smaller subset of images or sub-images), that is to be transmitted to the ground-based station. Thus, the ground-based station that receives the smaller subset of images can more efficiently process the reduced number of images and decide if the captured images in the small geo-located area include ships, or false-positives.

In another non-limiting example, satellites can monitor the number of cars in a parking lot. In doing so, satellites can algorithmically count cars each time the satellite sensors pass over the parking lot. As a result, rather than sending numerous images of a parking lot location, the satellite can transmit a single number that indicates the number of cars counted. Again, this scenario can maximize bandwidth utilization by eliminating the need to transmit images of the parking lot location at all, and simply results in the transmission of a number to a ground-based station, thereby greatly decreasing the required bandwidth and making additional bandwidth available for other communication purposes.

In another non-limiting example, on-board processing of image data can allow real-time decisions to be made that optimize image collection opportunities and prioritize the acquisition of valuable data. For example, a satellite may carry a list of priorities, and chooses where to aim its various sensors in each moment based on ground conditions (clouds, aerosols, lighting, etc.). Information from different sensors can be evaluated and/or combined to make these decisions. For example, wide field-of-view sensors can be used to make decisions on where to aim higher resolution cameras; thermal information can be used to aim a hyper-spectral camera, and so forth. In this way, the different payloads of the satellite can feed data to a control system that is able to make decisions based upon the data received from one particular payload and then task other payloads based upon the received data.

Where a satellite is capable of identifying objects or land-use characteristics, as described herein, the satellite can be given tasking instructions based on content. For example, every time the satellite detects a corn field, the satellite can calculate a particular parameter associated with the cornfield, and if the parameter is higher than a predetermined threshold, the satellite can capture additional imaging data associated with the cornfield and transmit the imaging data. Similarly, the satellite can be instructed that when it detects Route 66, it should follow the road with the high-resolution camera, count the number of cars, and if it detects a large truck, it should measure the temperature of the truck with a thermal and infrared camera ("TIR camera"). In this way, a satellite can autonomously create tasks based upon the content of sensor data. That is, the content of the sensor data can be used as an input into other systems and payloads on the satellite, and the satellite can activate other payloads based upon sensor data.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical elements.

DETAILED DESCRIPTION

Figure 1:
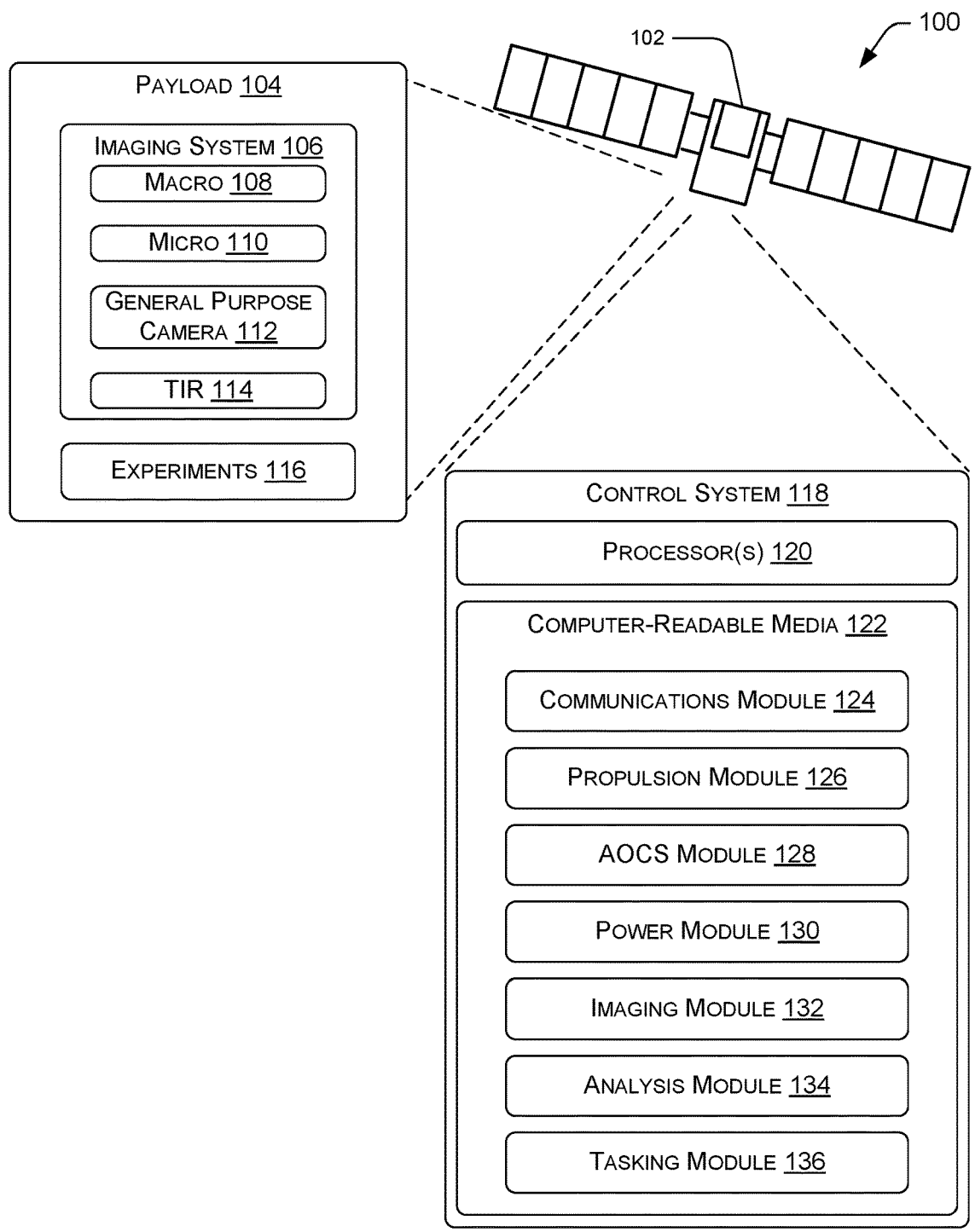
FIG. 1 is an illustration of a system overview depicting a satellite including one or more payloads and a control system for receiving input from the payloads and making decisions based upon the received input.

As illustrated in FIG. 1, a system 100 includes a satellite 102. The satellite 102 includes a payload 104, which in many cases will include an imaging system 106. The imaging system may include one or more cameras (also referred herein as "imaging sensor"), such as a macro camera 108 designed to capture relatively wide field of view imaging data, and a micro camera 110 having a relatively narrow field of view and which may generally also provide more detailed resolution images. A general purpose camera 112 may be incorporated for broad field of view imagery and may provide imaging data input to a cloud detection algorithm. A TIR camera 114 may also be incorporated for thermal imaging data and infrared imaging data. Additional cameras may include a multispectral camera or a hyperspectral camera, among others. Experiments and other sensors 116 may also be included as part of the satellite payload 104 for various purposes.

A control system 118 may be comprised of one or more on board computers for handling the functions of the payload 104 and other systems on board the satellite. The control system 18 may include one or more processors 120 and computer-readable media 122.

The described satellite system 100 provides for at least three beneficial features: i) pushing the image-processing pipeline to orbit; ii) automated tasking and scheduling; and iii) pushing higher-level image analytics to orbit. The satellite system 100 allows the satellite 102 to do in real-time much of the image processing pipeline, including transforming raw sensor data into geo-located, normalized, ortho-rectified images that are ready for interpretation and/or analysis. Much of this ability is stored as instructions, processes, and logic within the computer-readable media 122 of the satellite 102.

The computer-readable media 122 is non-transitory and may store various instructions, routines, operations, and modules that, when executed, cause the processors to perform various activities. In some implementations, the one or more processors 120 are central processing units (CPU), graphics processing units (GPU) or both CPU and GPU, or any other sort of processing unit, such as, for example, digital signal processors (DSPs), field programmable gate arrays (FPGAs), application-specific integrated circuits (ASICs), or others, such as, artificial intelligence and machine learning accelerators. The non-transitory computer-readable media 122 may include volatile and nonvolatile, removable and non-removable tangible, physical media implemented in technology for storage of information, such as computer-readable instructions, data structures, program modules, or other data. System memory, removable storage, and non-removable storage are all examples of non-transitory computer-readable media. Non-transitory computer-readable storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the system.

The computer-readable media 122 may store one or more modules for controlling the satellite 102 and the payload 104 and for other satellite-based tasks. In some embodiments, the control system 118 may include modules such as a communications module 124, a propulsion module 126, an attitude and orbital control subsystem ("AOCS") module 128, a power module 130, an imaging module 132, an analysis module 134, a tasking module 136, and a communication module 138. It should be appreciated that not all of the modules need be present in every embodiment, that additional modules may be present for other purposes, and that several modules may be present for one or many of the purposes described. The modules stored within the computer-readable media 122, in many instances, provide for control of other systems and hardware on board the satellite.

While the disclosure describes separate modules for performing specific acts and duties, it should be appreciated that all modules have functionality for collecting telemetry/operational data that is used for monitoring status/health of the satellite and for use in decision making by payload subsystems. This allows the modules to cooperate together and exchange data for monitoring the health and status of the satellite, and additionally for on-board evaluation, reprioritizing tasks, image selection, augmenting sensors, extracting higher level meaning, performing analytics, and automated tasking, among other things.

The communications module 124 may control the communications system to provide for a communication channel with one or more base stations on the surface of the Earth or with other satellites within a satellite constellation. The communications module 124 may be responsible for receiving instructions and data from ground or airborne stations, for transmitting data to ground or airborne stations, and for transmitting and receiving data and instructions to and from other satellites within the satellite constellation, or for transmitting and receiving data and instructions to and from other similarly equipped devices such as manned or unmanned aerial vehicles, balloons, cars, ships, and sensor networks. The communication module 124 may selectively transmit and receive data when a communication link has been established and may transmit data such as any images, the results of image analysis, scientific data, the position of the satellite 102 or the health of the satellite 102 or its systems.

The propulsion module 126 is largely responsible for controlling the propulsion system, such as for repositioning the satellite, as necessary. It may be any suitable spacecraft propulsion system, such as for example, a monopropellant or bipropellant chemical propulsion system, or an electric propulsion system, such as arcjet thrusters or plasma thrusters. The propulsion module 126, in combination with the AOCS module 128, maintains the satellite 102 in its desired position, orbit and attitude.

The AOCS module 128, as part of the AOCS, provides attitude information and maintains the satellite 102 attitude during its operational lifetime. It may include various sensors, such as stars, sun and earth sensors, gyroscopes, magnetometers, momentum and reaction wheels, magnetic torquers, and other such equipment to, in combination with the propulsion module, maintain the satellite moving along its desired path across space and with the desired orientation, to ensure the components of the payload or communication system are oriented in the proper direction.

The power module 130 has primary responsibility for sending commands to the power system, such as a solar power system for harvesting the sun's radiation and converting it into electrical power, for managing the power storage, and for maintaining the power conditioning units.

The imaging module 132 is primarily responsible for sending instructions to the hardware components of the imaging system 106 for capturing image data. The imaging module 132 may further include instructions for collecting, storing, cataloging, timestamping collected images, determining exposure, amplification gains, and image statistics, among other things. Furthermore, the imaging module 132 may further include instructions for processing the image data, such as segmenting, stitching, correcting, or rectifying the image data.

In some instances, the image acquisition and image processing may be handled by separate modules. For example, image acquisition may be handled by the imaging module 132 and image processing may have a separate image processing module for processing the image data generated by the imaging module 132, such as performing syntactic transformations on the images (e.g., corrections, stitching, rectification, etc.). In some instances, the image capture may be performed on-board the satellite, and some (or all) of the image processing may be performed off-board the satellite. The image processing capabilities may be shared between multiple satellites within a constellation, or between a satellite and a ground-based station.

The analysis module 134, which in some instances may be a part of the imaging module 132, allows much of the image analysis workflow to be performed on-board the satellite 102. The analysis module 134 allows much of the image analysis to be performed on board the satellite as opposed to sending images to a base station for analysis as is traditionally done. The analysis module 134 may include algorithms that allow the analysis module 134 to perform actions such as object detection, edge detection, feature recognition, and cloud detection, among others. Of course, image capture and analysis may be performed by the imaging module 132, or may be shared between the imaging module 132 and the analysis module 134. In some instances, the image analysis workflow may be shared between multiple satellites within a constellation, or between a satellite and a ground-based station.

In some cases, the image processing and/or image analysis includes instructions uploaded to the satellite. In addition, the image processing and/or analysis instructions may be specific to a particular task that the satellite has been tasked to complete.

The tasking module 136 may store a list of prioritized tasks uploaded from a base station, and may additionally reorder those tasks based upon opportunity. The tasking module 136 may further add new tasks based upon sensor data from the various on board sensors. As used herein, the term sensors is a broad term and refers to any sensors on board the satellite that generate data, and may include image sensors, instruments for Earth observation, temperature sensors (e.g., thermal imaging sensors, or infrared sensors), sun sensors, earth sensors, power meters, attitude sensors, and the like. As such, the tasking module 136 may use sensor data as an input and create new tasks or reprioritize tasks based upon sensor data.

Figure 2:
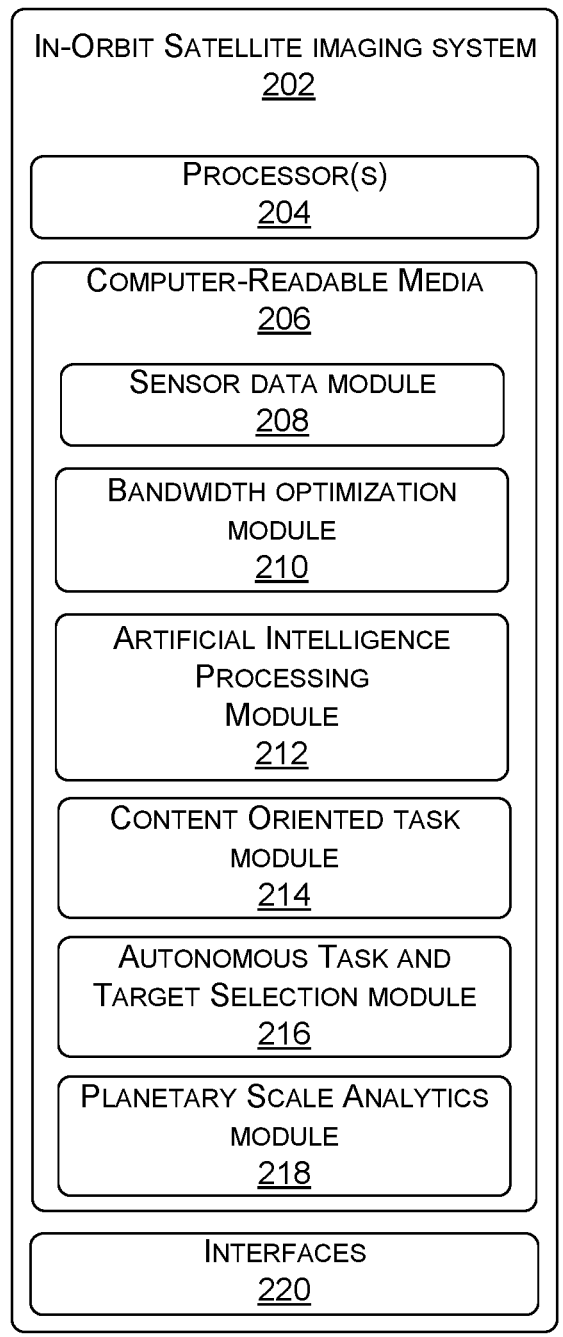
FIG. 2 is a block diagram of components of an example in-orbit satellite imaging system 202.

FIG. 2 provides a block diagram that illustrates some of the modules that form part of the imaging system 202. The imaging system 202 may include one or more processors 204. The processors 204 may be the same as the processors 120 of the control system, but in many instances are processors 204 dedicated to the imaging system 202. The processors 204 may be CPUs, GPUs, DSPs, FPGAs, ASICs, AI accelerators or any combination of these, or alternative type of suitable processors.

The imaging system 202 further may include computer-readable media 206 that stores one or more modules for controlling the imaging system hardware and for processing the imaging system data. Some of the modules may include a sensor data module 208, a bandwidth optimization module 210, a sensor data artificial intelligence (AI) processing module 212, a content oriented task module 214, an autonomous task and target selection module 216, a planetary scale analytics module 218, and interfaces 220.

The sensor data module 208 may receive sensor data from satellite sensors that include, but are not limited to, wide field of view sensors, high resolution cameras, hyper-spectral cameras, thermal imaging sensors, and infrared sensors.

The bandwidth optimization module 210 may be configured to minimize, or reduce, the bandwidth needed to transmit data and information from the satellite 102 to a base station. To this end, the bandwidth optimization module 210 may include algorithms for image segmentation, image compression, or other algorithms that are configured to reduce the overall amount of imaging data that is sent to a base station.

The sensor data artificial intelligence (AI) processing module 212 is primarily responsible for receiving data from the various sensors and, at least with respect to image data, making decisions regarding image segmentation, labeling, object recognition, and analysis. In some instances, the artificial intelligence ("AI") processing module 212 is a form of neural network (NN). The AI processing module 212 is capable of training NNs through supervised learning (SL), unsupervised learning (UL) or reinforced learning (RL), to perceive, encode, predict, and classify patterns or pattern sequences in the captured image data, and achieve human-level, and in many instances, superhuman level proficiency at image segmentation, image labeling, object recognition, detection of salient features and automated image analysis.

The NNs may be trained earth-side and then instantiated and evaluated on satellites in flight, or the NN training may be ongoing on-board the satellite during its operational lifecycle. The AI processing module 212 may take advantage of general computation hardware, like CPUs, or GPUs, digital signal processors, AI accelerators or on ad-hoc hardware architectures implemented in field programmable gate arrays ("FPGAs") or application-specific integrated circuits ("ASICs") or other hardware embeddings, to be applied to images, or image sequences taken by the imaging sensors of the satellite 102, and used, in-orbit, as general building blocks as part of an image processing pipeline, or an image analysis workflow, configured to catalogue, transform, and analyze images and image collections both in real-time and on batch-processes, without requiring downlink to a ground station or further processing outside the satellite 102 platform.

In a particular non-limiting implementation, Convolutional Neural Networks (CNN) are instanced in a CPU or GPU or an FPGA or AI accelerator onboard a satellite in orbit, and used to process images captured with a high-resolution camera, in real-time, and produce vector maps containing object shapes and object labels present in the original image data. The object shapes and object labels may correspond to a wide variety of human-made and naturally occurring objects (such as buildings, cars, roads, rivers, trees, agricultural fields, etc.).

The images that are effectively downloaded to the ground may be stored in an image analytics training platform, where they can be used to build training sets and to train machine learning algorithms, such as, for example, convolutional neural networks, deep belief networks, deep learning neural networks, and other suitable machine learning algorithms, to do image segmentation, labeling, object recognition and analysis.

Once the algorithms are trained, the trained instances can be uploaded and run in orbit on the satellites, and become available as tools to be applied in orbit.

The content oriented task module 214 is configured to receive the results of in-orbit image analysis as an input, and generate a prioritized list of tasks based on the image data content. For example, the satellite can be tasked such that when the object detection algorithms detect a palm-oil plantation, the satellite can be tasked to count the number of palm trees. This may be accomplished, for example, by activating the micro payload, which may be a camera having a relatively high spatial resolution, to capture one or more images of the palm-oil plantation. Based upon detected landscape features, the boundaries of the plantation may be determined, and high resolution images of the plantation may be captured, and through the use of object detection algorithms, the number of palm trees may be counted.

Continuing with the example, in one instance, rather than transmitting all the captured images of the plantation to an earth-based station (or just "base station"), the satellite may transmit a drastically reduced set of images, or perhaps just the information relating to the location of the plantation (or some other plantation identification) and the number of trees. In this way, the bandwidth associated with the downlink communications channel may be used far more efficiently than traditional satellite communications systems are utilized.

An in-orbit analysis module 134, that can do object detection, image segmentation, and analysis based on data coming from on-board sensors like a panchromatic, multispectral, or hyperspectral camera, can be used as the basis for making automated, on-the-fly satellite tasking decisions. For example, based upon objects detected in captured image data, the content oriented task module 214 can determine where to point the satellite, where to aim the different payloads, which payloads to activate or de-activate, which modes of operation to switch into, what and how much information to transmit, and the specific data processing workflows to enact.

In this way, satellite tasking can be specified (or determined) in terms of the content of the data the satellite collects. In another example implementation, a satellite can be tasked based on objects recognized, in real-time, from its high-resolution imaging camera such that whenever the satellite goes over an object that is recognized as a highway, the content oriented task module 214, in conjunction with the other modules such as the propulsion module 126 and the AOCS module 128, issue instructions to maneuver the satellite or its payload 104 to follow the highway, and in the event that it identifies a truck driving in the highway, it may execute a spotlight maneuver on top of the truck, and start filming high-resolution video while at the same time taking thermal images using a secondary payload. Additionally, the imaging system 106 may be instructed to activate the high resolution camera to capture high resolution images of the truck and, based upon object detection, determine the make and/or model of the truck, and only transmit that information to ground if nothing else is required.

The content oriented task module 214 enables the satellite to optimize data collection opportunities. For instance, a wide field-of-view camera can be used to capture a wide field of view image, which can be fed into an algorithm for cloud-detection. A high resolution, narrow field-of-view camera can then be oriented towards the detected cloud-free zones for optimizing the collection of cloud-free high-resolution imaging. Similarly, where the area of interest is completely obstructed by cloud cover, the imaging sensors need not be further activated or instructed to capture image data since the image data will have no real value.

The autonomous task and target selection module 216 may be implemented to automatically create and/or reprioritize satellite tasking based on any of a number of factors or combination of factors. For example, tasking decisions may be automatically made by the autonomous task and target selection module 216, that is, decision regarding pointing and maneuvering, payload activation and utilization, switching to different modes of operation, downlink prioritization and activation, etc., may be influenced by customer requirements and/or a globally maintained interest table.

While the modules have been described as having, in some instances, discrete functions and duties, in some instances there are tasks that may be common to all modules. For example, receiving telemetry data and monitoring the health and status of the satellite are functions that may be shared between some (or all) of the modules described herein. The cooperation between modules and subsystems allows the modules and subsystems to cooperate to exchange data for monitoring the health and status of the satellite, on-board evaluation, reprioritizing tasks, image selection, augmenting sensors, activating or deactivating various payloads, extracting higher level meaning, performing analytics, and automated tasking, among other things.

In some instances, a customer requiring specific satellite imaging data may input a request regarding an area of interest (AOI) or a point of interest (POI), a particular type of AOI as a polygon on the surface of the Earth in a particular coordinate system. Associated with the AOI, the customer selects and fills specific metadata to specify a Service Level Agreement (SLA). The SLA can include, for example, some or all of the following: monitoring frequency requirements (minimum frequency, maximum frequency, target frequency distribution); sensor types for acquisition (from available payloads, imaging and otherwise); sensor processing pipeline specifications (for radiometric correction, ortho-rectification, stitching, projection models, sensor models, atmospheric correction, geo-location, etc.); sensor analysis workflow (including raster and vector processing blocks, machine learning modules, intermediate storage procedures, etc.); data required on the ground (data types, results of sensor analysis workflow, and frequencies, or trigger conditions [for example, only download X if a certain parameter exceeds a threshold]); and storage requirements (min storage, max storage, cache-cleaning procedures, data phasing strategies). In some cases, a customer may also specify a bidding price, such as a maximum price the customer is willing to pay for accomplishing the SLA.

In some cases, the customer is given the ability to specify (or provide) programs to be uploaded to the satellite to be executed, and some of these may be executed on-demand. Examples of this type of service, for example, are to allow a customer to train and upload their own machine learning algorithms, which can be configured to conduct image processing and analysis, and to only send data corresponding to areas or objects of interest that meet certain criteria as defined by the customer. In this way, images (or desired data based upon image analysis) are selected and transmitted based upon customer criteria, and in some instances, the satellite owner never learns how the customer is processing, analyzing, or selecting images.

An AOI (or POI) with an associated SLA may be referred to as a Contract. Contracts generated from input from customers may be considered Customer Contracts. Other types of contracts may be generated automatically by prioritization algorithms from open-source data. For example, Contracts may be automatically generated, such as by tracking changes in OpenStreetMaps (OSM) or other crowd-sourced Geo-information databases; by processing real-time fees from social networks such as Twitter or other social network feeds; by monitoring geo-located news; or otherwise. As an example, in the case where a news source may be reporting on live events unfolding in a particular region, the satellite may receive from the ground or from other satellites information associated with the news report, and automatically generate a contract that includes an AOI and an SLA and task the satellite to capture image data, which may include video data, of the events unfolding in the geo-located AOL Other Contracts may be generated in the satellite as a result of image processing and on-board image analytics (e.g., as a result of the execution of other existing Contracts).

The satellite may establish a communications channel as it passes over a ground station. In some instances, an information exchange protocol may be executed where the satellite receives from the ground station an updated list of Contracts and the satellite sends to the ground station new Contracts that were created in orbit since the last contact. Optionally, the ground station may send the satellite updated vector and raster maps to support the SLAs in the Contracts in the updated list. For example the ground station may send a new vector map with changes to OSM near the AOIs. In some cases, the satellite may send to the ground station the status of its short-term planning, including its prioritized task list.

When the satellite receives an updated list of Contracts, or when it finishes execution of a Contract, it may recalculate its short-term planning, which may include maneuvers, modes, payload utilization, available energy, and other such information, in order to maximize the expected value generated over the next orbit based on the sum of the bidding price for each Contract, over the collection of contracts that can be sequentially completed, taking into consideration maneuver restrictions, payload conflict, power consumption, duty cycles, heat dissipation, and all other operative constraints on the satellite platform and payloads. Based upon this short-term planning, a customer may receive information indicating an anticipated time-frame for completing a particular Contract. In addition, a customer may be notified how an increase in the bid price may affect the time-frame for completing a particular Contract. That is, if a bid price is increased, the satellite may recalculate its short-term planning and move the particular contract higher up on the priority list.

In this manner, satellites may be tasked automatically based on a dynamic set of priorities in combination with opportunistic imaging.

The planetary scale analytics module 218 is responsible for conducting analysis of AOIs and POIs. The planetary scale analytics module 218 may communicate with other satellites within a satellite constellation to compare prioritized task lists and, based upon opportunity cost, may exchange tasks with other satellites. In this way, the tasks may be shared between satellites within a constellation to improve the efficiency of the tasks that are generated for the satellites.

For example, perhaps a first satellite has been tasked to capture images of a particular AOI. The first satellite, relying on wide field of view images and its cloud detection algorithm, determines that the AOI is obstructed by cloud cover. The first satellite could reprioritize capturing images of the AOI for its next orbit; however, in order to advance to its next task the satellite will have to maneuver to a new position which makes it inefficient to return to the AOI on its next orbit. Alternatively, the first satellite could determine, based upon cloud edge detection and apparent cloud velocity, that the cloud cover is only temporary. The first satellite may then communicate with a second satellite that may be able to maneuver to capture the desired images of the AOI with much more efficiency. In this way, a satellite constellation improves the efficiency of completing tasks by sharing and exchanging tasks with other satellites.

Figure 3:
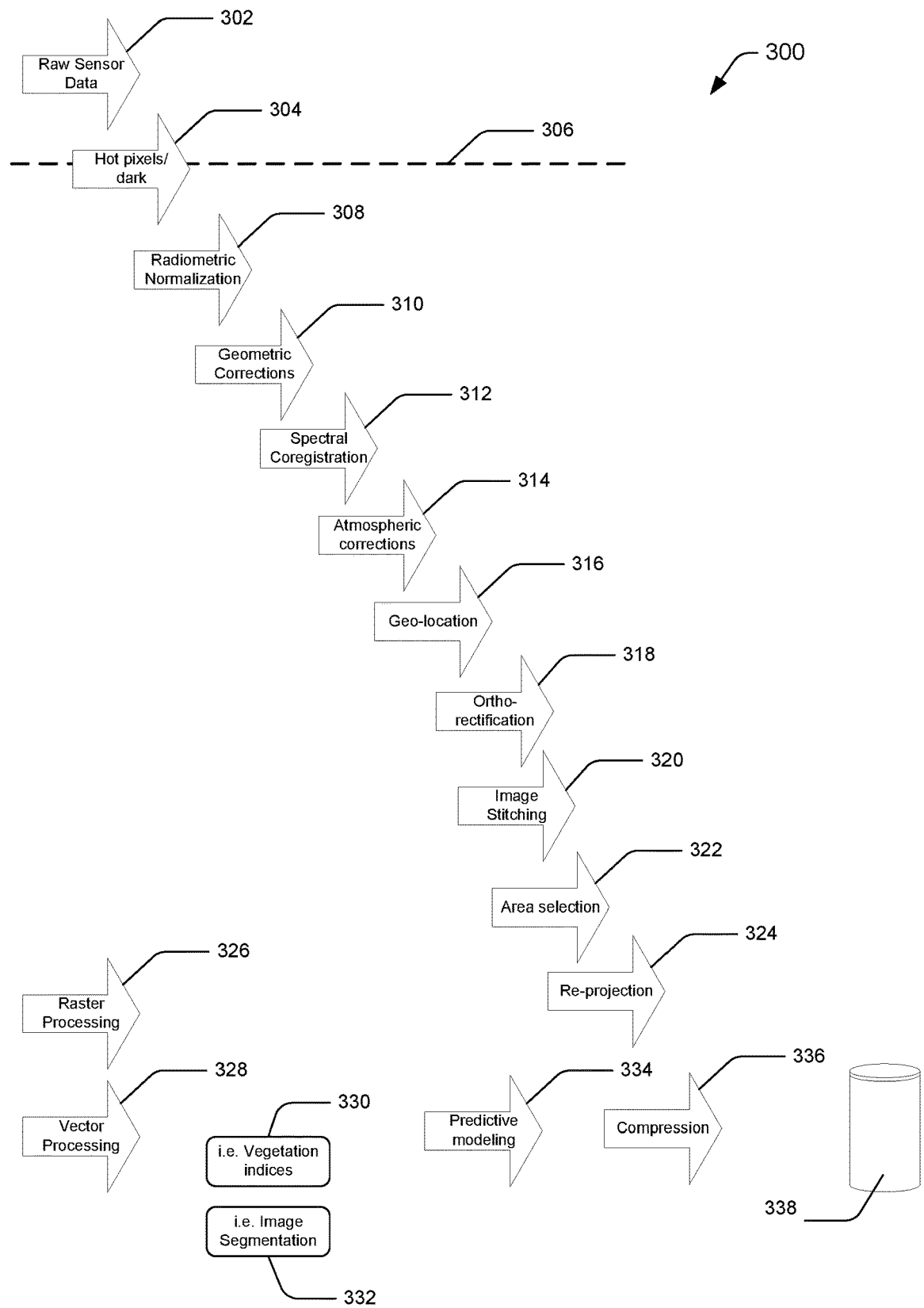
FIG. 3 is a pictorial flow diagram of some of the imaging tasks performed by in-orbit satellites.

With reference to FIG. 3, a pictorial flow diagram of the tasks performed by in-orbit satellites 300 is represented, including a nominal image processing pipeline, vector and raster processing and predictive modeling. The functions may be performed by the processing capability of the satellite while in-orbit, and sent to a ground-based station after processing.

At block 302, raw sensor data is captured by one or more sensors, as described herein. Optionally, the sensors are calibrated, which may be performed earth-side or in orbit. At block 304, a hot/dark pixel correction calibration technique may be applied.

Hot/dark pixel correction: At block 304, a table-based algorithm may be applied where hot and dark pixels are identified by x-y position on the imaging sensor and interpolated as an average of surrounding pixels. A phenomenon of digital image sensors, especially when taking long exposures, is that single pixels may appear to be much brighter than surrounding pixels. A hot pixel/dark pixel table may be initialized on the ground as part of sensor calibration, and it is maintained by re-calibrating the sensor onboard the satellite, such as by taking dark images (e.g., at night, with low exposure times) to identify hot pixels, and white images (e.g., aiming at ice-caps, with long exposure times) to identify dark pixels.

The hot pixels are primarily caused by charge leakage within the imaging sensor while the dark pixels may be caused by contamination on the sensor. In either case, the hot and dark pixels impair the faithful reproduction of the light signal. By understanding and mapping the physical location on the imaging sensor and the magnitude of these hot and dark pixels, resulting images can later be corrected by adjusting the pixel values at locations associated with these abnormal pixels.

In many cases, the hot/dark pixel correction is performed earth-side, as indicated by dotted line 306. The line 306 indicates a demarcation between operations performed earth-side versus those performed while in-orbit. As illustrated, line 306 intersects block 304, indicating the hot/dark pixel calibration may be performed either earth-side or in-orbit, or both. However, in typical satellites, the entire image processing pipeline is pushed earth-side which requires the satellite to essentially transmit every image it captures to a base station for image processing and analysis. This results in large amounts of data (e.g. image data) being stored on board the satellite and then transmitted through the downlink communications channel.

By contrast, the pushing of the image-processing pipeline to the satellite, including in-orbit area selection (e.g., downloading a polygon, instead of the entire imaged scene, both pre-fixed geographically, and based on automated analysis of the image, like in cloud-detection) provides numerous advantages. The image-processing pipeline includes the following blocks with an example standard implementations.

Radiometric Normalization: At block 308, a standard implementation of radiometric normalization relies on a table-based algorithm. For each pixel in the sensor, a calibration polynomial is maintained that correlates the digital numbers ("DN readings"), (which indicates the digital output of the sensor) to the $W/m^2$ hitting the pixel. The normalization table may be initialized on the ground using a calibrated spectro-radiometer and an integration sphere. The calibration table may be maintained periodically in orbit by targeting targets of known reflectance properties.

Geometric Corrections: At block 310, the image geometry is corrected to account for distortions caused by the sensor pointing away from nadir. To achieve the most accurate imaging data, the imaging sensors should be pointed at nadir, that is, pointed in the direction of the force of gravity at that location. However, when an imaging sensor is pointed away from nadir, geometric distortions are introduced into the image data, which can be corrected through known geometric correction algorithms. This may accomplished by a simple geometric transformation, and resampling of the resulting image to a target resolution grid. Additional geometric distortions may be introduced by the lenses and minors in the optical path, which can likewise be corrected for through one or more known geometric correction algorithms.

Spectral co-registration: At block 312, the different spectral bands taken by the sensor may be co-registered so that they can be aligned with sub-pixel precision, using a simple correlation algorithm. One issue with digital imaging is that of chromatic aberration. This is caused when the lens fails to focus all colors of light to the same convergence point on the imaging sensor. This occurs because lenses have different refractive indices for different wavelengths of light. It is observable as fringes of color along boundaries between dark and bright parts of the image. Spectral co-registration corrects for this abnormality in the resulting image.

Atmospheric Correction: At block 314, the image is corrected in every spectral band to account for the distortions introduced by aerosols in the atmosphere. Typical implementations include: image-based atmospheric correction methods, atmospheric modeling methods, and models that require input of atmospheric pressure and temperature, or other variables from the ground. A sample implementation is the "Dark Pixel" method, an image-based atmospheric correction, where the pixels of dark targets are considered indicators of the upwelling path radiance in each spectral band, and used to normalize the pixel histograms in that band.

Geolocation: At block 316, geolocation accuracy can be obtained by the usage of ground control points (GCP). In a standard implementation, GCPs are stored on-board the satellite in a GCP database, and can be derived automatically for correctly stitched ortho-rectified imaging with a sub-pixel precision. That is, where overlapping image frames each contain a GCP, the GCP can be used to accurately map the overlap between the image frames and can further be used to stitch the images together to create panoramic images or image mosaics. Geolocation information may also be used for performing ortho-rectification of the images.

Ortho-rectification: At block 318, an image is geometrically rectified to take into account the elevation of the ground and adjusted for topographic relief. For this, a DEM (Digital Elevation Model) may be used, such as SRTM C-band Version 2 of NASA, and a direct geo-referencing approach using rational polynomial functions (RPF), or other algorithms, to create an accurate orthophoto as distortions in the image due to the varying distance between the imaging sensor and different points on the ground need to be corrected.

Image Stitching: At block 320, images taken at different times are stitched together in orbit to form mosaics. In a standard implementation, image features may be selected automatically by a combination of edge-detection algorithms, co-registration algorithms, object detection algorithms, or geolocation, and used for sub-pixel relative image positioning.

Area Selection: At block 322, areas of interest (AOI) may be projected as vector layers onto the ortho-rectified image mosaics, and used a basis for selecting or discarding data for further processing, or for downloading to the ground. In other words, an AOI may be segmented from a larger image and only the segmented portion of the image data is saved and/or analyzed while the remainder of the image data is discarded. Segmentation may be performed, as an example, by drawing a polygon around pixels that exhibit the features of interest, and only saving the pixels found within the polygon and discarding or compressing more aggressively the remainder of the imaging data.

Re-Projections: At block 324, geometric re-projection to different coordinate systems may be done in-orbit to prepare data to be fused with existing databases. For example, image data may be reprojected onto an ellipsoid model, such as WGS84, which is the current standard reference coordinate system used by the Global Positioning System.

Raster processing: At block 326, images, mosaics or areas of interest in images or mosaics are transformed, pixel-by-pixel into images of the same size and shape. For example, by calculating a normalized difference vegetation index ("NDVI"), using the Red and Near Infrared bands in a multispectral image, a false color representation of vegetation robustness can be created.

Vector processing: At block 328, images, mosaics or areas of interest in images or mosaics can be processed to be transformed into vector maps, representing and labeling characteristics present in the original input. For example, an object detection algorithm may be run on a high-resolution image of a road to identify cars, and may label them according to color, in a vector map representation. In some instances, vector processing allows the image analysis to determine semantic objects present within the image data. The vector processing may incorporate points, lines, polygons, and other geometric forms for vector map transformation.

This type of image processing can further be used to apply one or more vegetation indices, or be used for image segmentation. For example, where the satellite is used to capture images of a corn field, the NDVI (or other indexes) may be used to initially locate and identify the corn field. Subsequently, an edge detection algorithm may determine the edges of the cornfield, and the boundary of the corn field may be defined by vectors. The image data may then be segmented, such as by storing the area within the vectors for further analysis or transmission to a base station, while the area outside the vectors may be discarded, or all the image can be discarded when all the information required is properly represented by vectors.

Predictive Models: At 334, based on a collection of images, mosaics, areas of interest in images or mosaics, vector maps and rasters, predictive models may be used that forecast the results of future observations, and predict dependent variables, or that fit well-defined parameterized models that can be applied to the collected data. These predictive models may be maintained in orbit or downloaded to the ground. As an example, a collection of NDVI rasters of the same location is used to predict the future evolution of the phenological curve of a particular crop. Standard implementations of predictive models would include elastic-net regularized generalized linear models, or ensembles of decision trees ("Random Forests").

Compression and encryption: At 336, image mosaics, areas of interest, processed rasters, vector maps or predictive models may be compressed in-orbit with a lossless compression algorithm (for example with run-length encoding, or Lempel-Ziv-Welch algorithms), or with a lossy compression algorithm (for example, using wavelets or discrete cosine transform) prior to downlink. Compressed images can further be encrypted and signed with a variety of symmetric and public-key cryptography algorithms and protocols to ensure confidentiality, integrity and authentication of their origin during transfer and afterwards.

At block 338, the processed image data may be stored on board the satellite until a downlink communications channel is established with a base station and the data can be transmitted. By pushing the image-processing pipeline to the satellites, and defining an algorithm workflow to apply on each acquired sensor frame, downlink requirements can be minimized.

For example, 60% of the world is covered with clouds, so 60% of the pixels of images currently downloaded from satellites are of clouds, which carry no relevant information (unless the satellite is specifically tasked to capture images of clouds). By pushing cloud-detection algorithms to the satellites, and having the ability to segment the images in-orbit and only download the parts of the images that are cloudless, we realize an immediate 60% direct gain in the information we can bring to the ground with the same downlink system. Alternatively, the images, or portions of images, that contain clouds may be compressed to more efficiently utilize the available bandwidth when sending image data to a ground-based station. Similarly, where images contain little contrast and no real semantic objects of interest, such as where portions of images (or entire images) depict a corn field, the areas depicting the corn field may be compressed to more efficiently utilize the available bandwidth.

Imagine someone is looking for a ship in the Gulf of Mexico. Traditionally, a satellite will capture numerous images of the Gulf of Mexico and each image is downloaded to Earth. Someone (or some system) must then look for the ship on every image on the ground until it is found. That requires downloading a lot of images. However, if ship detection algorithms are pushed to the satellites, one only needs to download a small geo-located area around ship-candidates, and decide on the ground if those where ships, or false-positives, but the amount of data downloaded was reduced significantly. Based on its available payloads and decision making abilities, a satellite may capture wide field of view images of the Gulf of Mexico, and when ship candidates are identified, high resolution images of those ship candidates may be captured and object detection algorithms can be used to detect the ship. Furthermore, object detection algorithms may be used to identify a particular ship of interest based upon physical characteristics of the ship.

If one is interested in monitoring the number of cars in a parking lot, it suffices for the satellite to algorithmically count the cars every time it passes over the parking lot and send down a single number, instead of having to download every high-resolution image of the parking lot for later analysis. In fact, in this scenario where a number of cars in a parking lot is the information of interest, the satellite does not need to store or transmit any images of the parking lot.

Figure 4:
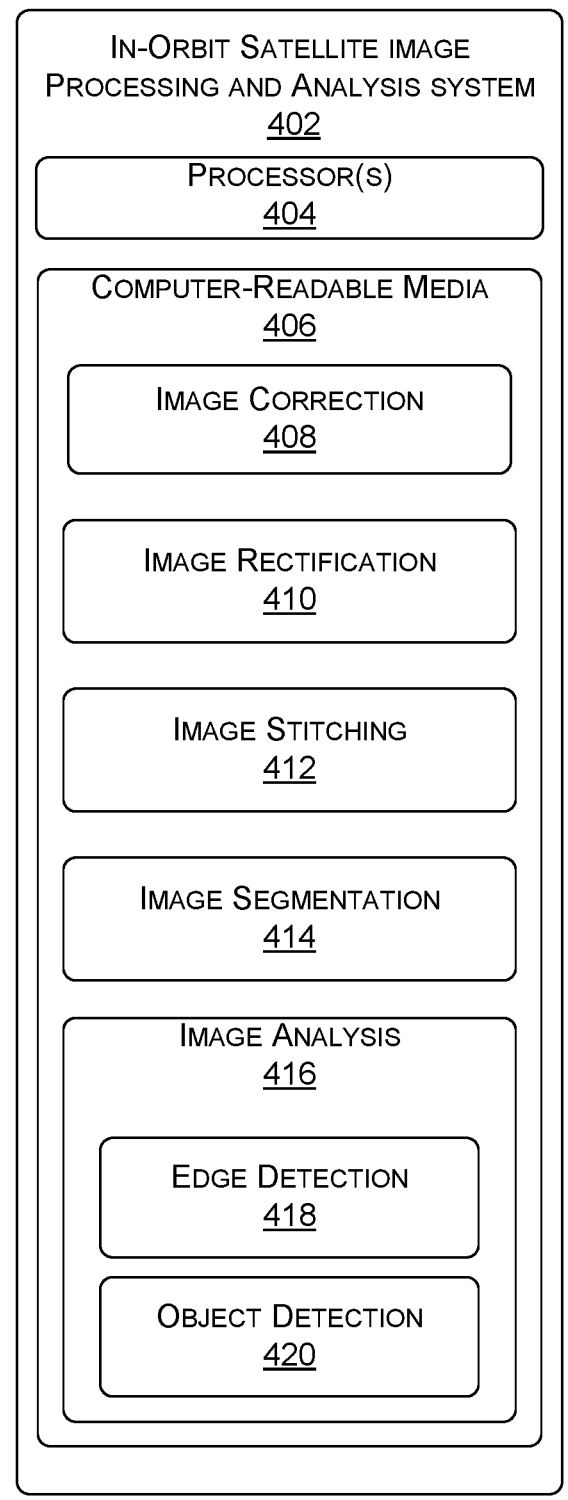
FIG. 4 is a block diagram of components of an image processing and analysis system.

With reference to FIG. 4, an in-orbit satellite image processing and analysis system 402 is represented. It may include one or more processors 404, which may be any suitable combination of one or more CPUs, GPUs, DSPs, FGPAs, ASICs, or AI accelerators. Computer-readable media 406 stores instructions, that when executed, cause the in-orbit satellite image processing and analysis system 402 to perform various acts. The instructions may be stored as a series of instructions or modules that interact with the physical systems on board the satellite to perform the various functions as described herein.

The computer-readable media 406 may store instructions that allow the image processing and analysis system 402 to perform one or more processing and analysis functions such as image correction 408, image rectification 410, image stitching 412, image segmentation 414, and image analysis 416, which may include edge detection 418 and object detection 420. The image processing and analysis system 402 may include more or less than the instructions listed and illustrated in FIG. 4. In addition, the instructions may be carried out in any order on the image sensor data and should not be limited to any particular ordering of operations.

Image correction 408 may include a variety of corrective actions on the image data such as the hot/dark pixel correction already described herein. It may further include processing techniques to correct for PSF deconvolution, chromatic aberration, atmospheric correction, radiometric normalization, and other types of color corrections. These techniques may utilize empirical models or available algorithms to process images captured by the imaging sensors. The algorithms executed in orbit work with raster data (e.g., calculations on a pixel-by-pixel basis), and with vector data (e.g., cartographical data, image segments, objects like buildings, roads, rivers, corn-fields, etc.), and can derive new raster and vector layers.

Image rectification 410 may include a variety of geometric corrective actions on the raster image data such as, for example, orthorectification or ellipsoid map projection. Orthorectification is the process of geometrically correcting the features in the image data such that the scale is uniform. This allows for the accurate measurement of distances between features in the image data, because it has been adjusted for topographic relief, lens distortion, and image sensor tilt, and thus results in a much more accurate representation of the Earth's surface than a non-corrected image.

Image stitching 412 may include one or more techniques for combining separate frames of image data into a single image. The imaging sensors on board a satellite may capture a sequence of images that are spatially and temporally spaced, yet have an overlapping field of view, and through image stitching 412, may combine them into a single photograph. Suitable algorithms for image stitching 412 are available, and generally rely upon a mathematical model of relating pixel coordinates in sequential image frames to align the image frames. Optimization techniques for combining pixel to pixel comparisons and gradient descent may be used to estimate the alignment. Features from each image may be detected and used to estimate the overlap and alignment. Finally, algorithms may be used to blend the transition between the overlapping image frames. Additional image processing techniques may be applied to stitched images, such as increasing the dynamic range, reducing noise, and increasing resolution, among others.

Image segmentation 414 may include one or more techniques for partitioning a digital image into multiple sets of pixels, which may be referred to as superpixels. One or more of these sets may be saved for further processing, while other sets may be discarded. The goal of segmentation is to simplify the image data so that it is more meaningful and more efficient to analyze. It also saves on storage resources and transmission bandwidth. Suitable algorithms for image segmentation include superpixel algorithms, K-means clustering, expectation maximization clustering, normalized graphs cuts, and watershed segmentation, to name a few.

As an example, where a satellite is tasked with counting cars in a parking lot, an image of the area of interest that includes the parking lot may include a field of view that corresponds to one square kilometer (0.38 square miles) of ground area, while the parking lot of interest may comprise only 0.08 km$^2$ (20 acres), which is a small portion of the field of view of the imaging sensor. The satellite, using edge detection or object detection algorithms, for example, may segment the image data into two pixel sets, one that includes the parking lot and one that does not include the parking lot. The pixel set that does not include the parking lot may be discarded, while the pixel set that includes the data of interest may be stored, analyzed, or otherwise processed.

Image analysis 416 may be performed on image data. Continuing with the previous example of the parking lot, once the image has been segmented such that the remaining image data contains object or features of interest, the image processing and analysis system 402 may analyze the remaining pixel set. Using one or more algorithms, such as edge detection 418 or object detection 420, the cars depicted in the segmented image data may be counted, catalogued, and/or identified.

Object detection 420 may utilize any suitable algorithm for identifying features or object depicted within image data. For example, an object database may be stored and features identified in the image data may be compared against entries in the object database in order to find matching objects. Object detection can be combined with object identification by compiling a database of known objects and comparing objects detected within the image data to objects entered in the object database. Object detection may be able to analyze image data generated by the imaging sensors and through various algorithms, such as edge detection 418, determine instances of semantic objects of certain classes (e.g., counting a number of cows in a pasture). There are many ways to perform edge detection; however, one of the common and simplest ways is by implementing a Gaussian smoothed step edge algorithm, which is an error function, to detect color value steps between adjacent pixels in a digital image. Other analysis techniques may be used to analyze the image frame such as edge matching, gradient matching, interpretation trees, and pose clustering, to name a few, to isolate objects depicted within the image frame.

By detecting the edges, object detection 420 is able to isolate likely objects and then compare these objects with objects stored in an object database to determine a match, and therefore identify objects. In this way, object detection 420 is able to detect and identify objects within the image data. In some instances, where a high resolution imaging sensor captures high resolution imaging data such that object detection 420 is able to isolate objects with a high degree of accuracy, the detected objects may be compared to known objects within an object database for object identification. That is, rather than simply counting the cars in the parking lot, the image processing and analysis system 402 may be able to identify the cars in the parking lot.

This may be particularly useful, for example, where the satellite has been tasked with searching for a particular ship within a large body of water, such as the Gulf of Mexico. While there may be many ships in the vicinity, through the exemplary processes and algorithms described herein, the image processing and analysis system 402 may be able to receive image data from a wide field of view image sensor, identify likely ship candidates, then receive higher resolution imaging data that isolates the likely ship candidates, and then through the use of object detection and object identification, identify the ships that are the likely ship candidates until it finds a match with the ship of interest. Traditionally, when tasked with this type of mission, a satellite may take numerous images of the Gulf of Mexico and transmit these images to an earth-side base station, where the images are analyzed for identification of likely ship candidates. The satellite may then autonomously decide or receive instructions to take higher resolution images of the likely ship candidates and send each of those photos or portions of photos to the base station for processing and analysis. As described herein, pushing the image processing and analysis pipeline to the satellite results in much faster results because vast amounts of image data do not need to be transmitted to a base station for analysis before a satellite is tasked with follow up actions, and the resulting data to be transmitted is significantly reduced because the satellite is able to identify the information of interest and discard the majority of the information that is not critical to the mission the satellite has been tasked to complete.

Figure 5:
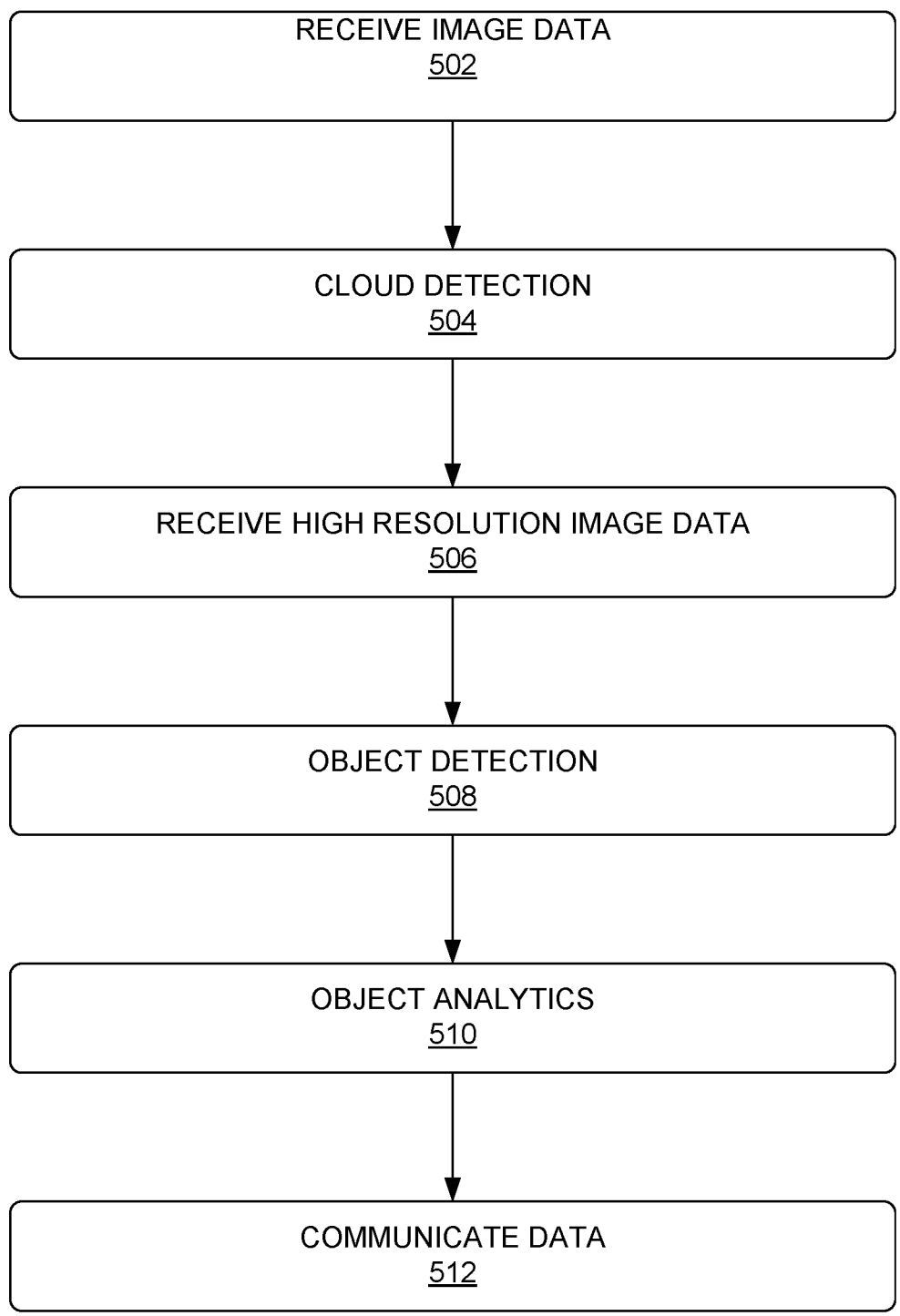
FIG. 5 is a flow diagram of an example process for satellite imaging.

FIG. 5 illustrates an example flow diagram for image processing and analysis. At block 502, image data is received. The image data may come from a wide field of view image sensor, such as a general purpose camera 112, or from a macro payload 108, such as a hyperspectral imaging camera, for example.

At block 504, the wide field of view image data may be run through a cloud detection algorithm to identify areas of the image that identify cloud cover, and other areas of the image that do not exhibit cloud cover. In some instances, the wide field of view image data may likewise be analyzed for other forms of obstructions. For example, obstructions may include fog, haze, shade, dust, sand, or any form of obstruction that may prevent a view of the features of interest. Furthermore, where the feature of interest is a street, a view of the street may be obstructed by cars or people on the street. As used herein, an unobstructed view is one in which the feature of interest is visible. In many cases, an unobstructed view is one in which an imaging sensor aboard a satellite is able to capture a feature of interest with sufficient detail to perform analysis on the image. In some cases, this includes a view of earth, and more particularly, a view of the surface of the earth, or objects upon the surface of the earth.

At block 506, high resolution image data may be received. As a result of the cloud detection algorithm, the high resolution imaging sensors may be instructed to capture high resolution images of areas of interest that are not obstructed by cloud cover.

At block 508, object detection algorithms may be run on the captured image data to detect objects or features of interest in the image data. This may include things like edge detection, agricultural detection, topographical features, man-made objects, and other such features or objects that may be present in image data.

At block 510, image analytics may be run on the image data to collect information about the object or features depicted. For example, in some instance, objects are to be counted, such as livestock, plants, cars, buildings, people, and the like. In other instances, image data that is separated temporally may be compared to determine changes in, for example, lake surface area, growing landmasses, buildings, the health of crops or forests, or increases in animal or human populations.

At block 512, the relevant data may be transmitted, such as to a base station. In some instances, the satellite may transmit images to the base station. The images may be a subset of the total number of images captured of an area of interest. Furthermore, the images may be portions of images captured of an area of interest, having been segmented as described herein. In other instances, the images may be stitched images, resulting from multiple still images being combined into an image larger than a single image frame. In still other instances, the relevant data may be numerical, such as the number of cars, a percentage of ground cover, or an increase in water surface area.

Figure 6:
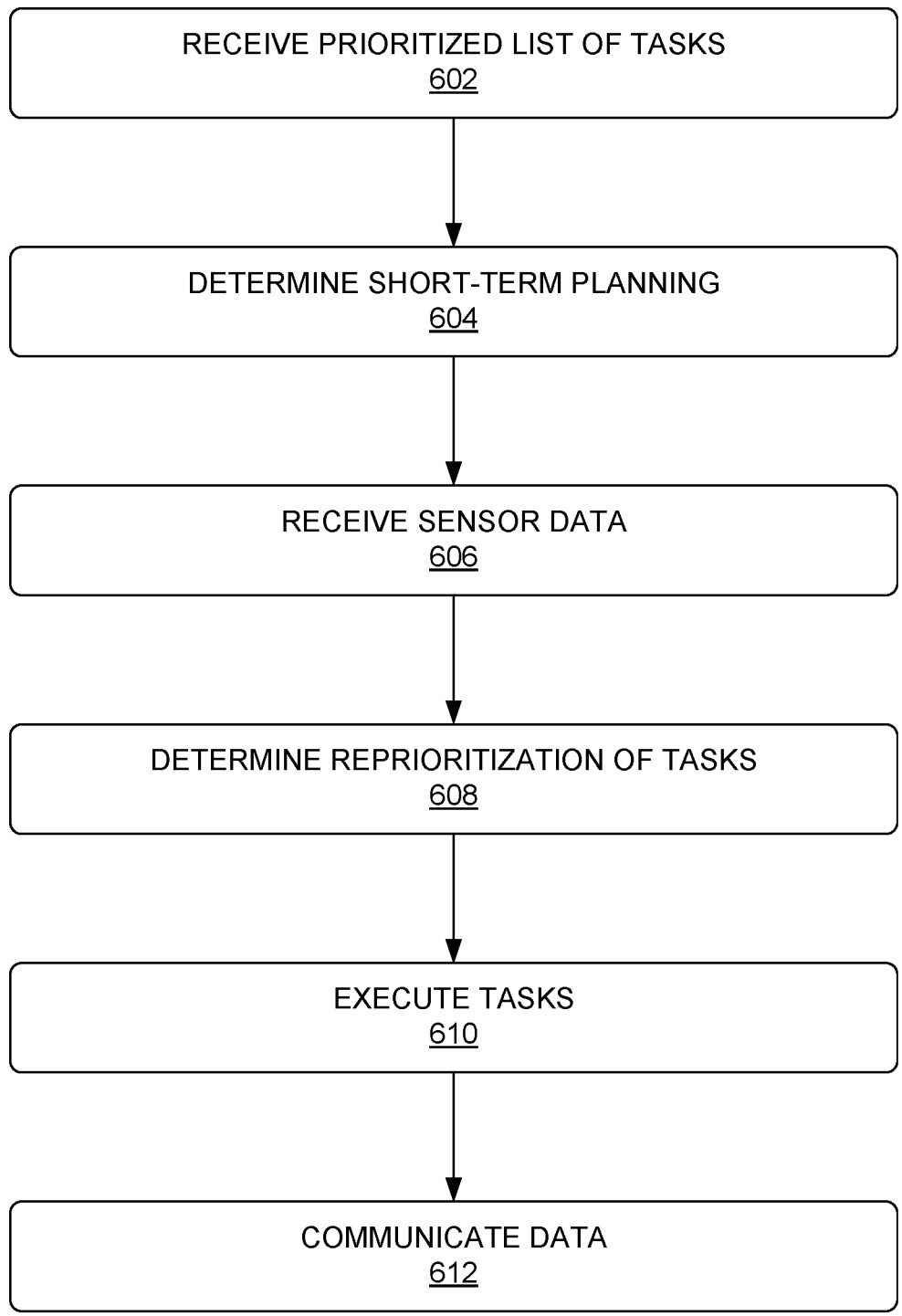
FIG. 6 is a flow diagram of an example process for opportunity-based satellite tasking.

With reference to FIG. 6, a flow diagram illustrates autonomous tasking and target selection. At block 602, the satellite receives a prioritized list of tasks. These tasks may be uploaded from a base station, may be created by the satellite itself, or may come from another satellite, such as a satellite within a constellation of satellites. As described herein, the tasks may be Contracts and the prioritized list may be assembled by comparing a cost-benefit ratio of each Contract taking into account variables such as maneuvering, power requirements, time efficiencies, and effects on subsequent tasks.

At block 604, the satellite, using the various modules and systems described herein, determines a short-term plan. This will include variables such as time on target, time to next target, altitude and attitude adjustments, the location of base stations, recalibrating imaging sensors, aiming imaging sensors, establishing downlink communication channels, allocating time for on-board computations such as image analysis, and the like. The short-term plan may therefore influence the prioritized list of tasks where the satellite determines that it can increase efficiency by changing the priority of one or more tasks in the prioritized list of tasks.

At 606, the satellite receives sensor data, such as from one or more imaging sensors. The imaging sensors may include wide field of view imaging sensors, narrow field of view imaging sensors, multispectral imaging sensors, hyperspectral imaging sensors, thermal and infrared imaging sensors, active radar sensors, passive radar sensors, and other such sensors designed for Earth observation.

At 608, the satellite may determine a reprioritization of tasks. The satellite tasking may be based on a constantly updated priority-map (e.g., heat map) of the world that the satellites keep, that can be updated from the ground when the satellites pass over the base stations, which can be also updated in orbit, with data coming from the sensors in real-time. This heat map may be used to implement an agent-based reverse bidding process which may represent, for example, the conflicting tasking requirements coming from different customers, to maximize the value of data to be collected.

The satellite tasking may be determined in response to the sensor data. For example, where the initial sensor data indicates smoke emanating from a volcano, where the smoke is above a predetermined threshold, the satellite may create a new task to capture additional high resolution images of the volcano, including thermal, infrared, and multispectral images.

In some instances, the detection of the smoke above a threshold value will cause the satellite to activate additional payloads, such as a hyperspectral imaging camera to collect detailed hyperspectral images of the volcano and the emitting gasses. In some instances, the hyperspectral camera may be an imaging Fourier transform spectrometer which may be used for the detection, identification, quantification, and visualization of the gasses emanating from the volcano. In this way, based upon the content of the imaging data (e.g., the volcanic cloud), the additional satellite payloads may be activated and new tasks created by the satellite without any communication or instruction from an earth-side base station.

The satellite may further create tasks to maneuver itself to remain on station, or to change its attitude for better imaging opportunities of the volcano. Thus, the satellite can have autonomous tasking by the satellite. In this way, the satellite creates its own control loop where payloads may interact with one another. In other words, the result of an instrument's measurement, or features detected and/or identified through image analysis, can trigger observation or measurement with another instrument on board the satellite. Additionally, the result may trigger changes to the satellite's attitude and the creation of additional tasks based upon the opportunity to gather useful information. The result is that a satellite can have a level of autonomy to operate in an event-driven manner, where a given payload broadcasts it output to other systems or subsystems within the satellite and other payloads can then be used to collect additional information. That is, an asynchronous one-to-many data feed can influence the tasks, and even create new tasks, for the satellite based upon the opportunity to collect useful data.

At block 610, the satellite executes the tasks in their prioritized order. This may require, for example, activating appropriate payloads, analyzing sensor data, and executing follow up tasks.

At block 612, the relevant data is communicated, such as to a base station. As described, the communication may include image data, such as by sending digital images, or may include numerical data, analysis data, or some other information. The data may be stored on board the satellite until it is convenient for the satellite to establish a downlink communication channel with a base station and transmit the necessary data.

Figure 7:
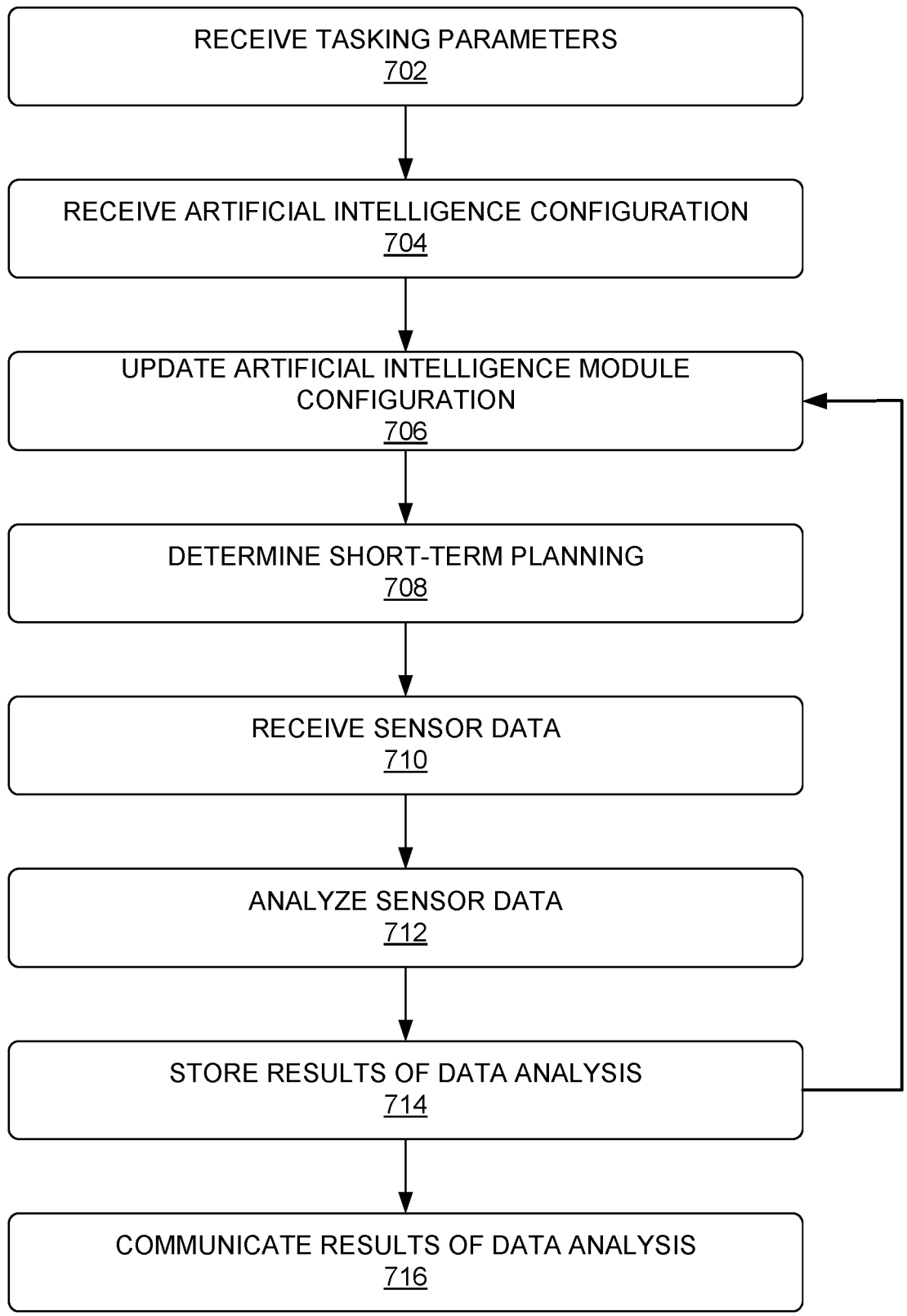
FIG. 7 is a flow diagram of an example process of on-board analysis with artificial intelligence.

With reference to FIG. 7, a flow diagram illustrates an example process of on-board analysis with artificial intelligence. At block 702, tasking parameters are received. These may include conditions precedent that trigger execution of one or more tasks. For example, the tasking parameters may include an available optical path to an area of interest or a point of interest, maximum sun elevation, maximum slant angle, task priorities, time of day, available payloads, available power, and other such parameters that may affect the task to be performed.

At block 704, the satellite receives artificial intelligence configuration. The artificial intelligence ("AI") configuration may define a neural network for the artificial intelligence module (e.g., 212 of FIG. 2). The AI configuration may include a pre-trained neural network, which may be trained on the ground before being uploaded to the satellite. The pre-trained neural network may be trained for any suitable task, such as analyzing images to detect a specific object, or may be trained as a land use classifier, or for determining environmental indicators, for example. The neural network may further be updated, or receive additional training, while on-board the satellite to accomplish additional tasks.

At block 706, the artificial intelligence module configuration is updated with on-board data, such as data gathered by one or more on-board sensors. This may include data such as imaging data, satellite health data, image analysis data, satellite orientation data, and other such data that is available from the various sensors on-board the satellite.

At block 708, short-term planning is determined. This may be based upon a prioritization of tasks, and may include new tasks created on-board the satellite, such as by the AI module, or based upon image analysis, or new contracts uploaded to the satellite.

At block 710, sensor data is received. In some instances, the sensor data is from an imaging sensor that is tasked for Earth observation. The sensor data may include image data from one or more of the payloads on-board the satellite, and may include image data captured by a general purpose camera, a high resolution camera, a TIR camera, a multi-spectral camera, a hyper-spectral camera, or other imaging device. It may additionally include data from other sensors, such as attitude sensors, orientation sensors, sun sensors, earth sensors, power sensors, or sensors related to other satellite systems or subsystems, for example.

At block 712, the sensor data is analyzed by any suitable analysis technique, routine, or algorithm, many of which have been described herein by way of example. In some cases, the analysis is performed by artificial intelligence. For example, artificial intelligence analysis allows for scene interpretation, or an understanding of what is happening within an image. This may be useful, for example, for detecting forest fires, traffic congestion, military altercations, and other events captured by imaging sensors of the satellite. Of course, additional AI analysis can be performed to determine significant events, changes, or objects depicted within image data captured by the imaging sensors.

At block 714, the results of the data analysis are stored. The data analysis results may be stored in memory on-board the satellite, such as in a non-transitory memory, for further processing, transmission to another location, or for further analysis. Additionally, some or all of the sensor data may be stored in the memory, such as imaging data or portions of imaging data.

In some instances, the process may return to block 706, such as for feeding the results of the data analysis back into the AI configuration as an input to further train the AI. By iteratively training the AI, it is able to perform image analysis with a greater degree of accuracy and complexity. The AI may undergo repeated, or even ongoing, training during the service life of the satellite to improve its performance and accuracy.

At block 716, the results of the data analysis are communicated. In some examples, the imaging data need not be communicated, but rather, only the results of the image analysis may be communicated. For example, where the satellite is tasked with determining the agricultural health of crops within a field, the data analysis may include a percentage of the crops that are exhibiting stress indicators. The determined percentage may be communicated, such as by sending a number to a ground-station. Additionally, a portion of an image that displays the crop field may also be transmitted. In some cases, the imaging data may be a multispectral image, such as a four-band, or six-band image, that shows the results of the NDVI index determination to highlight areas of the field where crops are exhibiting stress indicators.

Figure 8:
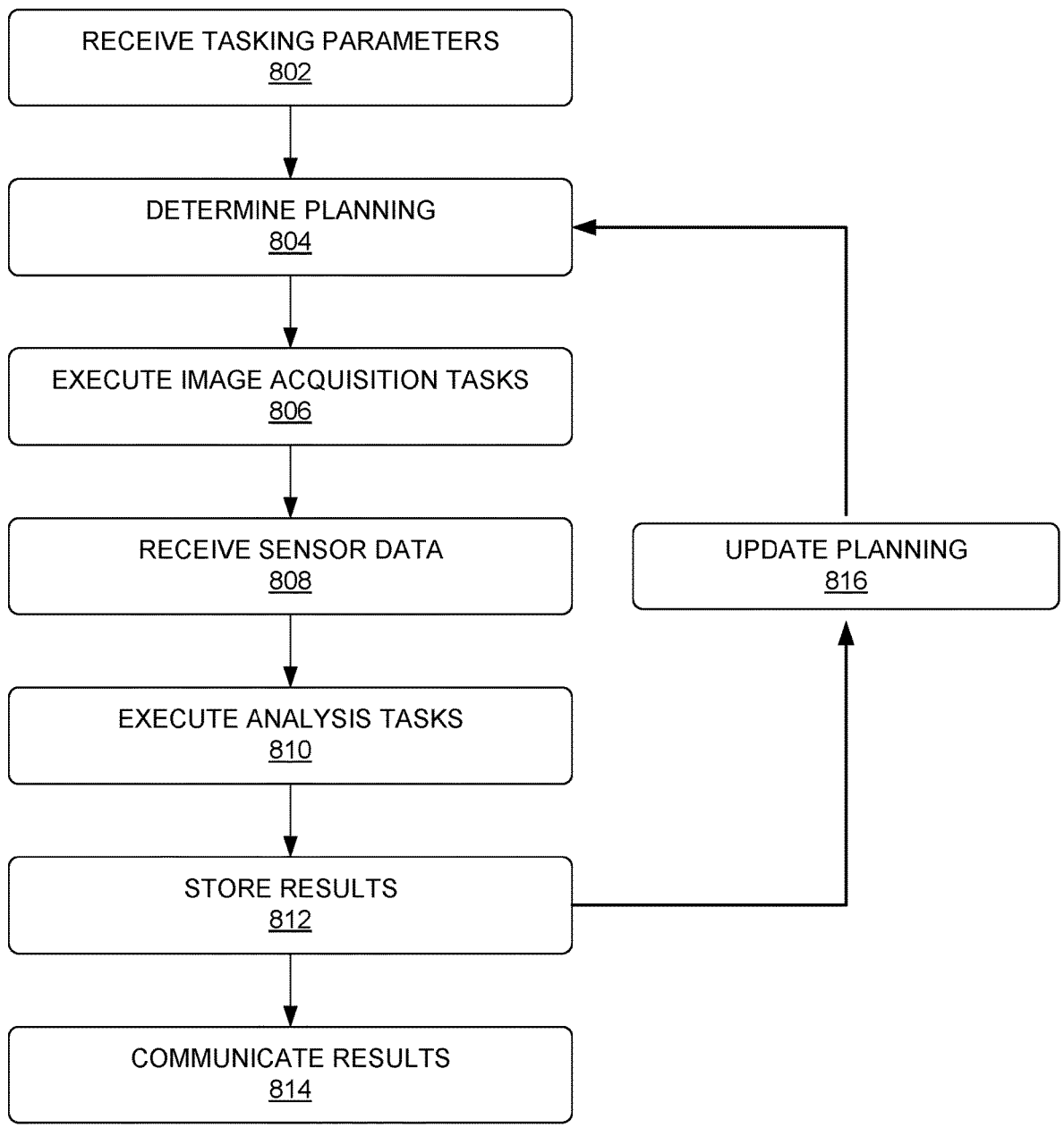
FIG. 8 is a flow diagram of an example process for on-board replanning and retasking a satellite.

With reference to FIG. 8, an example process for replanning and retasking a satellite is illustrated. At block 802, the satellite receives tasking parameters. As described above, the tasking parameters may specify conditions that trigger executing one or more tasks.

At block 804, the satellite determines its planning. This may be based upon a list of tasks that are prioritized based upon a variety of factors, and may additionally include new tasks that the satellite determines it should perform, as well as tasks communicated from other satellites. In some cases, the planning is based upon cost factors, opportunity factors, and value factors. For example, where a satellite needs to reorient itself, there is a cost associated with the reorientation, both in terms of spent fuel, and also in terms of an opportunity cost of missed opportunities based upon the reorientation. Furthermore, the satellite may determine there is an opportunity to execute other tasks based upon efficiency. For example, where one task is moved down the priority list because the satellite determines the area of interest is mostly obscured by clouds and the satellite moves to a next task in the priority list, if the satellite determines that the cloud cover has dissipated sufficiently, it may recognize the opportunity to revisit the earlier task and capture images of the area of interest. Finally, one or more value factors may be related to the satellite operator's expected compensation for completing a task. That is, where a customer is willing to pay an agreed upon price for completing a task, that task may be prioritized with the value of that task taken into account.

The planning may be determined using available data from many sources, including from ground-based station, and on-board storage. The planning may include prioritizing and accommodating tasks according to the cost, opportunity, and value factors.

At block 806, the image acquisition tasks are completed. This may be performed by activating one or more payloads on-board the satellite and capturing one or more images of areas or objects of interest. This may additionally include maneuvering the satellite to point to areas or features of interest.

At block 808, sensor data is received, which may include sensor data from one or more imaging sensors.

At block 810, analysis tasks are completed, such as by analyzing one or more images captured by the imaging sensors. The analysis may include feature recognition, object detection, image segmentation, object identification, and other such analytical tasks. The analysis may further include neural network analysis, such as by using the AI capabilities to extract meaningful data from the image data that may be useful for replanning and creating new tasks for the satellite to complete.

At block 812, the results of the analysis tasks is stored on-board the satellite, such as in memory.

At block 814, the results of the analysis are communicated, such as to a ground-station or to another satellite.

At block 816, the planning is updated, and may be influenced by the results of analysis. For example, where the analysis of the sensor data indicates that additional images would be beneficial, the planning may be updated to execute additional image acquisition tasks.

Figure 9:
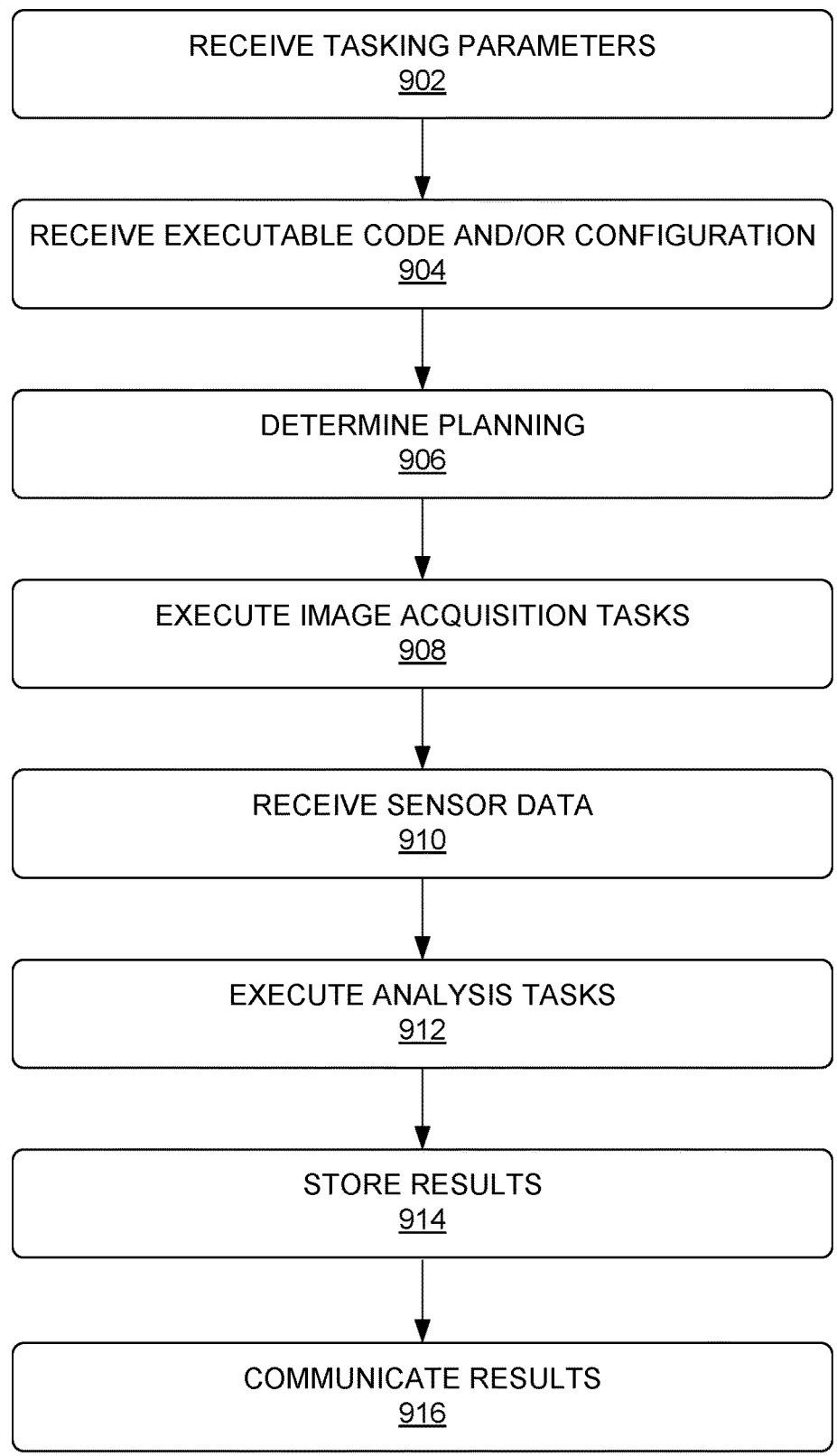
FIG. 9 is a flow diagram of an example process for on-board dynamic code execution.

With reference to FIG. 9, an example process for on-board dynamic code execution is illustrated. At block 902, tasking parameters are received. The tasking parameters may specify conditions which, when detected, trigger execution of one or more tasks.

At block 904, executable code and/or configuration settings are received. In some cases, the executable code and associated configuration settings are saved for later execution, such as when a trigger condition is detected. The executable code may be in the form of binary code comprised of native instructions, or it may be in any suitable scripting language, such as, for example, Python, Java, Smalltalk, or any other suitable programming language capable of providing instructions to the satellite.

At block 906, planning is determined, such as short-term planning of the satellite to include execution of tasks, maneuvers, and priorities. Where the satellite receives new executable code, such as described at block 904, the executable code may influence planning at block 906. That is, the executable code and associated configuration settings may be used during planning, such as to make planning determinations. In other words, the executable code may influence the prioritization of tasks or the creation of tasks. In addition, the received executable code may be used in a planned task to be executed at a later time.

At block 908, image acquisition tasks are executed. Where a task requires imaging data, the satellite activates one or more payloads and instructs the one or more payloads to capture images of areas of interest or points of interest for processing, analysis, and storage.

At block 910, the sensor data, such as imaging data, is received from the payloads instructed to capture images. The imaging data may be used as an input into several different processes, such as image process, image analysis, and satellite attitude and orbital control subsystems, for example.

At block 912, analysis tasks are executed. In some cases, this entails image analysis, such as object detection, feature recognition, cloud detection, image segmentation, and other suitable image analysis tasks. In some instances, the executable code received at block 904 may direct image analysis routines to be performed on image data.

At block 914, the results are stored. In some cases, the results are images, or portions of images captured by the payloads. In other cases, the results are the results of analysis and may or may not include the related image data.

At block 916, the results are communicated, such as to a ground-based station. As further described herein, the communication may include all of the images captures, or less than all the images captured, such as portions of images, or fewer than the number of images captured. In other cases, the results may include the results of any analysis, such as a count of the number of trees on a plantation, the percentage of a crop that is exhibiting stress indicators, the surface area of a lake, and so forth.

According to some embodiments, an orbital satellite system includes one or more sensors, which may be any form of earth observation sensors, or satellite health and status sensors. One or more processors are coupled to memory which includes one or more modules that include instructions executable by the one or more processors. The modules allow the satellite system to receive, from a ground-based device or from another satellite system, a request for data that includes a request to determine one or more parameters relating to at least one object within a particular geographic region. Based upon the request, the satellite system captures, by a first sensor of the one or more sensors, one or more images associated with the particular geographic region. The modules further allow the satellite system to analyze the one more images to determine that a first subset of the images provides an unobstructed view of the particular geographic region. This may be based, for example, on determining that there is little or no cloud cover, such that the geographic region is visible in the images. Other forms of obstruction may be detected, such as fog, shadow, smoke, or other such conditions that may inhibit a clear view of the particular geographic region.

The satellite system then uses its sensors to capture, based at least in part upon the first subset of images providing an unobstructed view, a second set of images, the second set of images captured by a second sensor having a higher resolution that the first sensor. A higher resolution sensor may include a narrower field of view, a higher pixel count sensor, a multispectral imaging sensor, a hyperspectral imaging sensor, or some other configuration of imaging sensor that is able to capture details that may not readily be apparent in a first image captured by a first imaging sensor.

The satellite system is able to determine that the second set of images includes data associated with the at least one object. This may be accomplished by executing artificial intelligence algorithms or machine learning algorithms on the satellite to make determinations about the objects depicted within the second set of images. Of course, where one or more of the first set of images provides sufficient detail, the satellite system may forego capturing a second set of images and perform the appropriate analysis directly on the first set of images. The satellite is able to determine the one or more parameters associated with the request for data, based at least in part on the first set of images or the second set of images, and transmit the one or more parameters to the ground-based device.

In some instances, the one or more parameters include counting objects within the particular geographic region. In some instances, the satellite system is configured to determine that a first subset of images of the one or more images provides an unobstructed view of the particular geographic region comprises analyzing the one or more images using a cloud-detection algorithm to identify areas of the image that are unobstructed by clouds.

The request for data may include a set of instructions provided to the satellite system that are to be executed when the satellite determines that one or more conditions are satisfied. For example, the one or more conditions may include a current time and date, a location, position, orientation, available payloads, available energy, or current temperature of the orbital satellite system. That is, when the satellite system determines that the one or more conditions are met, it autonomously executes the set of instructions.

According to another exemplary embodiment, a satellite system includes one or more processors, an imaging system, and one or more memories coupled to the one or more processors. The one or more memories include instructions, that when executed by the one or more processors, cause the one or more processors to issue commands to the imaging system to capture by a first imaging sensor of the imaging system, one or more first images. The one or more first image are analyzed to identify a feature of interest. Based upon the feature of interest, the system determines a second set of instructions to be executed by the one or more processors. In other words, the satellite system analyzes the one or more first images and makes decisions about what to do based upon the image analysis. Based upon the second set of instructions, the system captures one or more second images. The system analyzes the one or more second images to generate an analysis and transmits the analysis to a ground station.

In some cases, analyzing the one or more first images includes executing a cloud-detection algorithm to determine areas of the one or more first images in which a view of the earth is unobstructed by clouds. Analyzing the one or more first images may also include executing an object detection algorithm to detect objects on the earth.

The satellite system may further be able to segment the one or more second images into subimages such that at least a first subimage contains the feature of interest. This may be accomplished, for example, by any suitable image segmentation algorithm or routine that is run on the satellite system. The satellite system may further be able to determine a number of instances of a semantic object of a predetermined class. In other words, the satellite system may be able to analyze an image and determine objects depicted within the image and count the number of objects. Determining objects may additionally include determining conditions caused by, or related to, the objects. For example, determining a number of cars within an area may be indicative of a traffic jam. Furthermore, detecting that a number of cars are moving below a threshold speed may further indicate a traffic jam. As another example, determining objects may include identifying objects, such as a specific type of crop growing in an area. Furthermore, the crop may be identified, and its health may be determined, such as by analyzing one or more images and calculating an NDVI index. As still another example, determining objects may include determining ambient conditions, such as humidity, a UV index, clouds, and other such condition information associated with an area of interest. The satellite system may ultimately transmit the number of counted objects, a subimage that contains the feature of interest, one or more images that include less than the images the satellite system captures, the identification of an existing condition, such as a traffic occurrence or the crop health, or in some cases, it may transmit all the images it captures to a ground-based station.

In some instances, the second set of instructions cause the satellite system to be repositioned. That is, as the satellite system analyzes the images and detects objects, it may make the determination to reposition itself. Repositioning may include changing its attitude, altitude, orbit, aiming one or more payloads, and the like. Moreover, the second set of instructions may include changing a priority of instructions the satellite system is tasked to perform. In other words, as the satellite system analyzes images, it may determine to move tasks that are lower down on a priority to a higher priority position. Additionally, the satellite system may create new tasks based upon the image analysis the satellite system performs.

The images may be analyzed by executing artificial intelligence or machine learning algorithms on board. Alternatively or additionally, the satellite system may analyze the images by executing instructions received from a ground-station or from another satellite.

According to other exemplary embodiments, a method includes capturing, by an imaging sensor on-board the satellite, a first image. The first image is analyzed to determine objects depicted within the image. Based upon analyzing the first image, the satellite system determines a task to perform and performs the task. This is a fundamental change from traditional satellite tasking, in which a satellite waits for instructions from a ground station before taking any action. In contrast, the system and methods described herein allow a satellite to make determinations about the tasks that it is to perform. That is, the satellite system itself can create tasks, reprioritize tasks, and carry out these tasks without receiving direct immediate instructions to do so from a ground-based station. In large part, these task determinations are made based upon analyzing images captured by the satellite system.

The task that the satellite performs may include transmitting an image analysis to a location independent of the orbiting satellite. That is, the satellite may analyze an image, or a set of images, and transmit the analysis to a ground-based station, another satellite, an aerial platform, or some other location. The image analysis may include any suitable image analysis, such as, for example, object detection, object identification, segmenting an image into subimages, and the like. The method of further includes capturing a second image. The second image may have a higher resolution than the first image, or it may be a multispectral image or a hyperspectral image. The task for the satellite to perform may include changing the orientation of the satellite. In other cases, the task to perform includes activating a payload of the satellite. In other cases, the satellite captures a plurality of images and transmits less than the plurality of images to a ground station. This may include transmitting entire images, but not all of the images captured. It may also include segmenting one more images into subimages and transmitting one or more subimages. In some cases, the satellite system makes determinations about the objects detected in the images and sends the determination with or without sending the actual images.

The method may further include capturing a second image, and in some instances, the second image has a higher resolution than the first image. Objects depicted in the second image may be identified, such as by executing an object detection algorithm that may compare the objects to known objects stored within a database to search by matching objects. The method may include counting a number of objects depicted in the second image and sending the number to a ground station. Where the task includes providing a number of objects at a location, the satellite system need not transmit any images to the ground, but rather can analyze the images, count the number of semantic objects of interest, and send only the desired number to a ground-based station.

Alternatively, the method may include transmitting the task to perform to a second satellite and the second satellite performs the task. Additionally, the second satellite may transmit the task to perform to a third satellite to perform. This is useful, for example, where a second or a third satellite may have a better opportunity to complete the task than the first satellite. In this way, satellites may share tasks and priorities based upon cost factors, opportunity factors, available payloads, available power, and other such factors to improve overall efficiency in the capture, analysis, storage, and transmission of relevant information to the ground.

Although the present disclosure may use language that is specific to structural features and/or methodological acts, the invention is not limited to the specific features or acts described herein. Rather, the specific features and acts are disclosed as illustrative forms of implementing various forms of the systems and methods described herein.

What is claimed:

1. A satellite, comprising:
   one or more sensors;
   one or more processors; and
   memory coupled to the one or more processors, the memory including one or more modules that are executable by the one or more processors to:
   receive a request for data, the request for data including one or more image processing workflow specifications and/or an image analysis workflow used for on-board processing and analysis operations for the request for data;
   receive raw image sensor data from the one or more sensors;
   transform, on-board the satellite and based at least in part on the one or more image processing workflow specifications, the raw image sensor data to generate processed image sensor data suitable for interpretation and/or analysis;
   determine, on-board the satellite and based at least in part on the processed image sensor data generated for the request for data, one or more artificial intelligence software building blocks and/or one or more artificial intelligence hardware building blocks, as part of the image analysis workflow to use or apply the image analysis workflow for the processed image sensor data;
   analyze, based at least in part on the instantiated image analysis workflow, the processed image sensor data to generate analysis results;
   store the analysis results in the memory on-board the satellite for further processing, for transmission to another location, or for further analysis; and
   calculate a short-term planning for the satellite based on at least one of a prioritization of tasks, image analysis, the analysis results, or contracts uploaded to the satellite;
   wherein the image analysis workflow further comprises an artificial intelligence configuration which is updated on-board the satellite with on-board data.

2. The satellite as in claim 1, wherein the analysis results include information associated with at least one object or feature of interest on the surface of the earth; and wherein the one or more modules are further executable to determine, based upon the information associated with the at least one object or feature of interest on the surface of the earth, a set of instructions to be executed by the one or more processors.

3. The satellite as in claim 2, wherein the set of instructions include capturing one or more images, repositioning the satellite, changing a priority of instructions the satellite is tasked to perform or creating a new task for the satellite to complete.

4. The satellite as in claim 1, wherein the one or more modules are further executable to feed the analysis results back into the artificial intelligence configuration to further train the artificial intelligence configuration.

5. The satellite as in claim 4, wherein the one or more modules are further executable to receive the artificial intelligence configuration from a ground station or from another satellite.

6. The satellite as in claim 1, wherein the one or more modules are further executable to receive executable code and/or configuration settings to be executed in orbit on-demand.

7. The satellite as in claim 4, wherein the artificial intelligence configuration comprises a neural network trained on the ground before being uploaded to the satellite, updated while on-board the satellite, or additionally trained while on-board the satellite.

8. The satellite as in claim 7, wherein the artificial intelligence configuration is trained for analyzing images to detect objects or features, as a land use classifier, for determining changes or events, or for determining environmental indicators.

9. The satellite as in claim 4, wherein the on-board data comprises at least one of imaging data, satellite health data, image analysis data, or satellite orientation data.

10. The satellite as in claim 1, wherein the one or more modules are further executable to receive tasking parameters including conditions precedent that trigger execution of one or more tasks.

11. The satellite as in claim 10, wherein the conditions include an available optical path to an area of interest or a point of interest, minimum sun elevation, maximum slant angle, task priorities, time of day, available payloads, and available power.

12. A method under control of one or more processors in a satellite, the method comprising:
   receiving a request for data, the request for data including a request to determine information associated with at least one object or feature of interest on the surface of the earth;
   receiving raw image sensor data from one or more sensors on-board the satellite;
   determining, on-board the satellite and based at least in part on the request for data, an image processing workflow used for on-board processing operations for the request for data;
   processing, on-board the satellite and based at least in part on the image processing workflow, the raw image sensor data to generate processed image sensor data generated for the request for data;
   determining, based at least in part on the processed image sensor data generated for the request for data, one or more artificial intelligence software building blocks and/or one or more artificial intelligence hardware building blocks, as part of an image analysis workflow to use or apply the image analysis workflow for the processed image sensor data;
   analyzing, based at least in part on the instantiated image analysis workflow, the processed image sensor data to generate analysis results;

storing the analysis results in memory on-board the satellite for further processing, for transmission to another location, or for further analysis; and calculate a short-term planning for the satellite based on at least one of a prioritization of tasks, image analysis, the analysis results, or contracts uploaded to the satellite;

wherein the image analysis workflow is performed on-board the satellite by an artificial intelligence configuration comprising a neural network.

13. The method as in claim 12, wherein the neural network is trained on the ground before being uploaded to the satellite, trained while on-board the satellite, or updated while on-board the satellite with data gathered by the one or more sensors on-board the satellite.

14. The method as in claim 13, wherein the data gathered by the one or more sensors on-board the satellite further comprises at least one of data available from the one or more sensors on-board the satellite, imaging data, satellite health data, image analysis data or satellite orientation data.

15. The method as in claim 12, wherein the analysis results include information associated with the at least one object or feature of interest on the surface of the earth.

16. The method as in claim 12, wherein the method further comprises determining, based at least in part on the analysis results, one or more tasks to perform; and performing the one or more tasks; wherein the one or more tasks to perform further comprise at least one of transmitting data or the analysis results to a location independent of the satellite, activating a payload of the satellite, and a new task determined based on artificial intelligence analysis.

17. A satellite, comprising:
one or more sensors;
one or more processors; and
memory coupled to the one or more processors, the memory including one or more modules that are executable by the one or more processors to:
receive image sensor data from the one or more sensors;
determine, on-board the satellite and based at least in part on the image sensor data, an image processing workflow used for on-board processing operations for the image sensor data;

process, based at least in part on the image processing workflow, the image sensor data to generate processed image sensor data;

determine, based at least in part on the processed image sensor data generated for the image sensor data, one or more artificial intelligence software building blocks and/or one or more artificial intelligence hardware building blocks, as part of an image analysis workflow to use or apply the image analysis workflow for the processed image sensor data;

analyze, based at least in part on the instantiated image analysis workflow, the processed image sensor data to generate analysis results;

store the analysis results in the memory on-board the satellite for further processing, for transmission to another location, or for further analysis; and calculate a short-term planning for the satellite based on at least one of a prioritization of tasks, image analysis, the analysis results, or contracts uploaded to the satellite;

wherein the image analysis workflow is performed on-board the satellite by an artificial intelligence configuration which is updated on-board the satellite with on-board data.

18. The satellite of claim 17, wherein the one or more modules are further executable to:
receive a request for data, the request for data including image processing workflow specifications and/or the image analysis workflow;
wherein the image analysis workflow comprises one or more machine learning modules.

19. The satellite of claim 17, wherein the one or more modules are further executable to feed the analysis results back into the artificial intelligence configuration to further train the artificial intelligence configuration.

\* \* \* \* \*